United States Patent
Kawaguchi

(10) Patent No.: US 9,310,965 B2
(45) Date of Patent: *Apr. 12, 2016

(54) INFORMATION PROCESSING APPARATUS, DISPLAY CONTROL METHOD AND DISPLAY CONTROL PROGRAM

(71) Applicant: Sony Corporation, Tokyo (JP)

(72) Inventor: Kimitaka Kawaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 14/100,868

(22) Filed: Dec. 9, 2013

(65) Prior Publication Data

US 2014/0101603 A1    Apr. 10, 2014

Related U.S. Application Data

(63) Continuation of application No. 12/267,747, filed on Nov. 10, 2008, now Pat. No. 8,631,345.

(30) Foreign Application Priority Data

Dec. 19, 2007    (JP) ................................. 2007-328030

(51) Int. Cl.
    *G06F 3/0481*    (2013.01)
    *G06F 3/0488*    (2013.01)
    *G09G 5/14*      (2006.01)

(52) U.S. Cl.
    CPC .......... *G06F 3/04817* (2013.01); *G06F 3/0481* (2013.01); *G06F 3/0488* (2013.01); *G06F 3/04886* (2013.01); *G06F 2203/04801* (2013.01); *G09G 5/14* (2013.01)

(58) Field of Classification Search
    CPC ............................................. G06F 2203/04801
    USPC ......... 715/788, 702, 810, 761, 763, 790, 791, 715/781, 792, 794, 796, 798, 801, 800, 797
    See application file for complete search history.

(56) References Cited

U.S. PATENT DOCUMENTS

| | | | | |
|---|---|---|---|---|
| 5,119,079 A | * | 6/1992 | Hube | G03G 15/5016 345/173 |
| 5,565,888 A | * | 10/1996 | Selker | G06F 3/04895 345/157 |
| 5,650,827 A | | 7/1997 | Tsumori et al. | |
| 5,796,402 A | * | 8/1998 | Ellison-Taylor | 715/792 |
| 5,841,420 A | | 11/1998 | Kaply et al. | |
| 5,859,639 A | | 1/1999 | Ebrahim | |

(Continued)

FOREIGN PATENT DOCUMENTS

| | | |
|---|---|---|
| JP | 63-19221 | 1/1988 |
| JP | 5-282116 | 10/1993 |

(Continued)

*Primary Examiner* — Tuyetlien T Tran
*Assistant Examiner* — David S Posigian
(74) *Attorney, Agent, or Firm* — Oblon, McClelland, Maier & Neustadt, L.L.P.

(57) ABSTRACT

An information processing apparatus includes: a display control section for displaying a window showing a first icon and a second icon of a predetermined display size on a display screen. The display control section reduces the display size of at least either the first icon or the second icon so as not to overlap with each other if it determines that the icons overlap with each other when it alters a display area of the window being displayed on the display screen.

18 Claims, 24 Drawing Sheets

(56) References Cited

U.S. PATENT DOCUMENTS

| | | | |
|---|---|---|---|
| 5,973,692 A * | 10/1999 | Knowlton et al. | 715/835 |
| 5,986,639 A * | 11/1999 | Ozawa | G06F 3/04842 345/157 |
| 6,061,064 A * | 5/2000 | Reichlen | 345/418 |
| 6,091,395 A * | 7/2000 | DeStefano | 715/862 |
| 6,192,183 B1 | 2/2001 | Taniguchi et al. | |
| 6,232,972 B1 * | 5/2001 | Arcuri et al. | 715/815 |
| 6,473,102 B1 * | 10/2002 | Rodden et al. | 715/788 |
| 6,624,831 B1 * | 9/2003 | Shahine et al. | 715/815 |
| 6,654,036 B1 * | 11/2003 | Jones | 715/798 |
| 7,263,670 B2 | 8/2007 | Rekimoto | |
| 7,509,588 B2 * | 3/2009 | Van Os et al. | 715/835 |
| 8,264,499 B1 * | 9/2012 | Landry et al. | 345/589 |
| 2002/0032696 A1 * | 3/2002 | Takiguchi et al. | 707/500.1 |
| 2003/0007015 A1 * | 1/2003 | Laffey et al. | 345/860 |
| 2003/0007016 A1 * | 1/2003 | Laffey | G06F 3/04812 715/861 |
| 2003/0189551 A1 | 10/2003 | Olsen | |
| 2003/0201914 A1 * | 10/2003 | Fujiwara et al. | 340/995.24 |
| 2004/0012506 A1 * | 1/2004 | Fujiwara et al. | 340/995.1 |
| 2004/0165009 A1 * | 8/2004 | Blakely et al. | 345/801 |
| 2004/0261038 A1 * | 12/2004 | Ording et al. | 715/792 |
| 2005/0060665 A1 * | 3/2005 | Rekimoto | 715/810 |
| 2005/0216864 A1 | 9/2005 | Dart et al. | |
| 2006/0198555 A1 * | 9/2006 | Hosotsubo | 382/162 |
| 2007/0022389 A1 * | 1/2007 | Ording et al. | 715/790 |
| 2007/0067729 A1 * | 3/2007 | Danielson et al. | 715/763 |
| 2007/0157089 A1 * | 7/2007 | Van Os et al. | 715/702 |
| 2007/0198184 A1 * | 8/2007 | Yoshioka et al. | 701/211 |
| 2007/0250788 A1 * | 10/2007 | Rigolet | 715/788 |
| 2007/0268261 A1 | 11/2007 | Lipson | |
| 2009/0164936 A1 | 6/2009 | Kawaguchi | |
| 2009/0172597 A1 | 7/2009 | Mercer | |

FOREIGN PATENT DOCUMENTS

| | | |
|---|---|---|
| JP | 6-348446 | 12/1994 |
| JP | 7-210355 | 8/1995 |
| JP | 9-251341 | 9/1997 |
| JP | 11-53161 | 2/1999 |
| JP | 11-237943 | 8/1999 |
| JP | 2001-290574 | 10/2001 |
| JP | 2001290574 A | 10/2001 |
| JP | 2003-5878 | 1/2003 |
| JP | 2003005878 A | 1/2003 |
| JP | 2005-4396 | 1/2005 |

* cited by examiner

INFORMATION PROCESSING APPARATUS, DISPLAY CONTROL METHOD AND DISPLAY CONTROL PROGRAM

CROSS REFERENCES TO RELATED APPLICATIONS

This application is a continuation of U.S. application Ser. No. 12/267,747, filed Nov. 10, 2008, which contains subject matter related to Japanese Patent Application JP2007-328030 filed in the Japanese Patent Office on Dec. 19, 2007, the entire contents of both of which are being incorporated herein by reference.

BACKGROUND OF THE INVENTION

1. Field of the Invention

The present invention relates to an information processing apparatus, a display control method and a display control program that can suitably find applications in the field of information processing apparatus having a multi-window type graphical user interface (GUI).

2. Description of the Related Art

Many information processing apparatus such as personal computers that have recently been and currently are being marketed have a GUI as user interface to allow the user to easily comprehend how to operate the input devices including a mouse and a touch panel at a glance.

Information processing apparatus of this type include those having a multi-window type GUI designed to display a plurality of windows that are assigned to respective processes so that the user can select a desired process by selecting the corresponding window.

Each window serves as the frame of the work area of each process, where characters and images that correspond to the process and a menu and icons (including buttons) showing the assigned commands that are executable for the process are arranged. For example, in the case of a window for a web browser, characters and images of a home page and a menu and icons showing the assigned commands relating to viewing the home page are arranged in the frame.

Icons common to the processes including icons for manipulating windows such as an icon for changing the display size of a window and an icon for closing a window are also arranged at a predetermined position in the windows. Thus, the user can manipulate windows by using such icons. For example, the user can alter the size of a window or close a window by means of the corresponding icon.

Furthermore, there have been proposed an information processing apparatus having a GUI by means of which the size of the displayed icons is altered in such a way that the occupancy ratio of the icons in each window is constantly held below a predetermined level if the user alters the size of a displayed window by operating the window (refer to, e.g., Jpn. Pat. Appln. Laid-Open Publication No. 2005-004396).

SUMMARY OF THE INVENTION

With an information processing apparatus as described above, the size of the icons being displayed in a window is reduced as the size of the window that is being displayed is reduced. With this arrangement, the icons can constantly be displayed in the window regardless of the size of the window that is being displayed. In other words, the user can freely alter the display size of a window without making the icons less visually recognizable.

However, the icons become less easy to handle as the size of the icons being displayed is reduced. Particularly, this problem becomes remarkable when the input device is a touch panel because the user has to touch one of the icons being displayed by a finger to use the icon.

Thus, existing image forming processing apparatus having a GUI is not able to provide a high degree of freedom for changing the size of the icons being displayed on a window and a high operability of icons at the same time.

In view of above-identified problem, the present invention proposes an information processing apparatus, a display control method and a display control program designed to raise the degree of freedom of operating a window while minimizing the fall of the operability of the icons in the window.

According to an aspect of the present invention, a window showing a first icon and a second icon of a predetermined display size is displayed on a display screen and the display size of at least either the first icon or the second icon is reduced if it is determined that the icons overlap with each other when a display area of the window on the display screen is altered.

Thus, the display size of the icons is not changed until the icons overlap if the display area of the window is reduced and the display size of at least either the first icon or the second icon is reduced only when the display area of the window is reduced further. Therefore, the display area of a window can be freely altered without changing the display size of the icons from the original size as long as possible.

According to the present invention, since the display size of the icons is not changed until an overlap of the icons occurs when the display area of the window is reduced and the display size of at least either the first icon or the second icon is reduced only when the display area of the window is reduced further, the display area of a window can be freely altered without changing the display size of the icons from the original size until the last minute. Therefore, the present invention can realize an information processing apparatus, a display control method and a display control program that raise the degree of freedom of manipulating a window while minimizing the fall of the operability of the icons in the window.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, preferred embodiments of the present invention will be described in greater detail by referring to the accompanying drawings.

(1) First Embodiment

Figure 1:
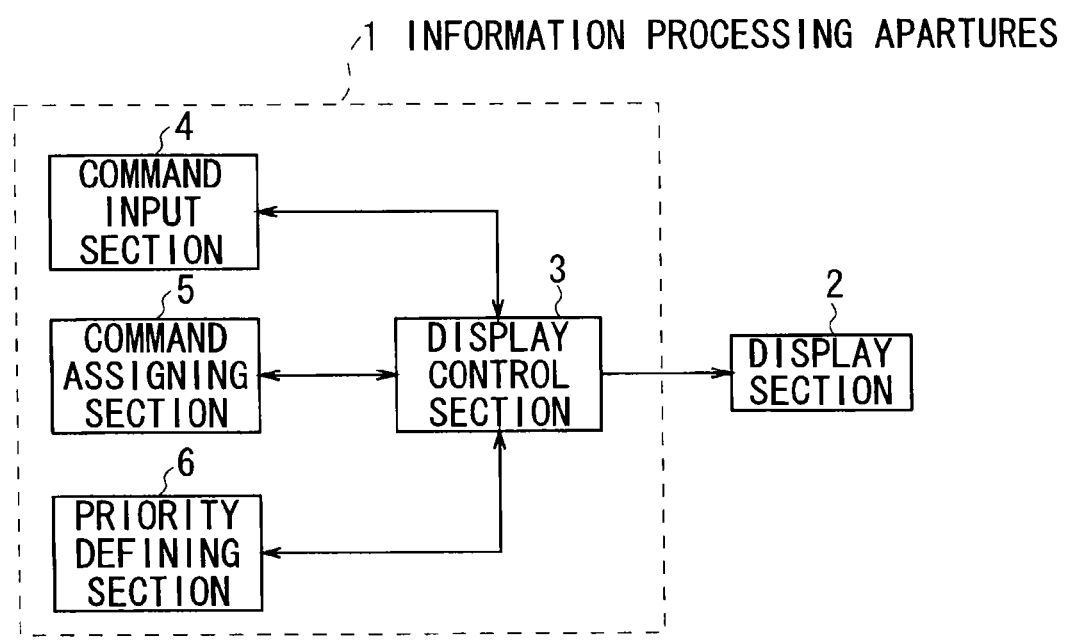
FIG. 1 is a schematic functional block diagram of information processing apparatus according to a first embodiment of the present invention, showing the functional configuration thereof.

To begin with, the first embodiment of the invention will be described. Referring to FIG. 1, reference symbol 1 denotes a functional block of an information processing apparatus. The information processing apparatus 1 has a display control section 3 for displaying a window where the first icon and the second icon are arranged on the display screen of display section 2.

When the user alters the display area of the window on the display screen, the display control section 3 reduces the display size of either the first icon or the second icon when it judges that the icons overlap as a result of the alteration of the display area.

Additionally, the information processing apparatus 1 has a command input section 4 by means of which the user can input a command to the window being displays on the display screen of the display section 2 and the display control section 3 alters the display area of the window according to the command to the window that is input by way of the command input section 4.

Still additionally, as a command for reducing the display size of the window is input by way of the command input section 4 of the information processing apparatus 1, the display control section 3 alters the display area of the window by reducing the display size of the window according to the command.

Furthermore, as a command for shifting the display position of the window is input by way of the command input section 4 of the information processing apparatus 1, the display control section 3 shifts the display position of the window according to the command. When the window partly moves out of the display screen as a result of the shift of the display position, the display control section 3 alters the display area of the window. When at least either the first icon or the second icon moves out of the display area as a result of the alteration of the display area, the display control section 3 shifts the icon that moves out of the display area into the display area so as to make it to be displayed.

Still additionally, as a command for shifting the display position of the window is input by way of the command input section 4 of the information processing apparatus 1, the display control section 3 shifts the display position of the window according to the command and, when the window partly moves out of the display screen as a result of the shift of the display position, it adjusts the display position of the window so as to make the window entirely to be found on the display screen.

Furthermore, the information processing apparatus 1 has a command assignment section 5 for assigning the first command and the second command respectively to the first icon and the second icon. When the display size of either the first icon or the second icon is made smaller than a predetermined display size under the control of the display control section 3, the command assignment section 5 selects either the first command assigned to the first icon and the second command assigned to the second icon and makes only the selected command effective.

Still additionally, the display control section 3 of the information processing apparatus 1 can reduce the display size of the first icon and the section icon without altering the recognizing region that recognizes an operation relative to the first icon and an operation relative to the second icon on the display screen.

Furthermore, the information processing apparatus 1 has a priority defining section 6 for defining priority for the first icon and the second icon in response to a change made to the display size and the display control section 3 reduces the display size of either the first icon or the second icon according to the defined priority.

Still additionally, the display control section 3 of the information processing apparatus 1 selects either the first mode in which the display area of the window can be altered and the second mode in which the display area of the window is not able to altered and hence it alters the display area of the window in the display screen only in the first mode.

In this way, if the information processing apparatus 1 reduces the display area of the window, it does not change the display size of either of the icons until it is inevitably forced to change the display size of either of the first icon or the second icon because it further reduces the display area of the window. Thus, the user can freely alter the display area of the window without changing the display size of either of the icons until the last minutes. Therefore, this embodiment can raise the degree of freedom of manipulating the window while minimizing the fall of the operability of the icons in the window.

(2) Second Embodiment

Now, the second embodiment of the present invention, which is a concrete example of the first embodiment, will be described below.

(2-1) Appearance of Information Communication Terminal

Figure 2A:
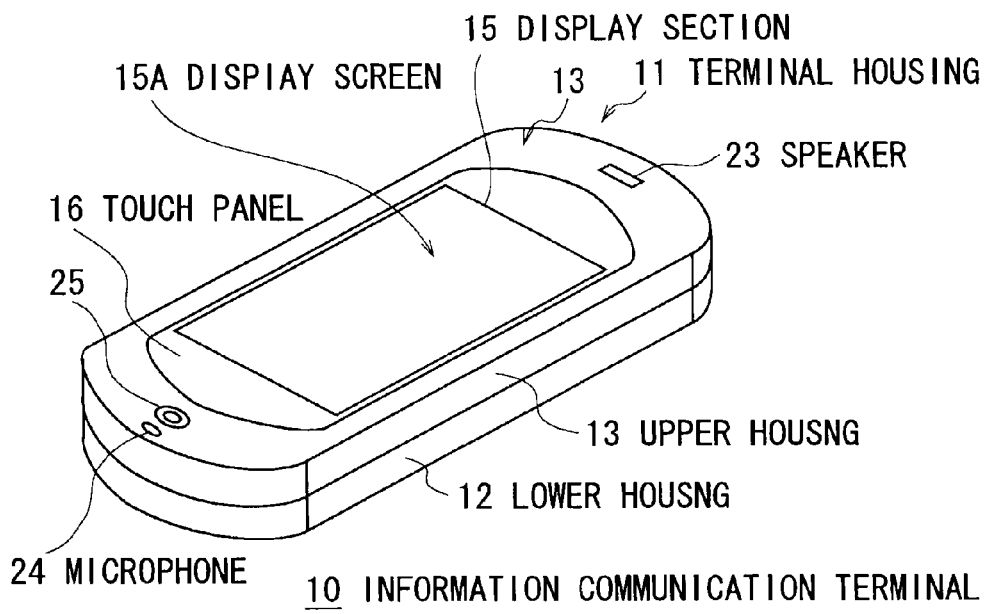
FIGS. 2A and 2B are schematic perspective views of information processing apparatus according to a second embodiment of the present invention, which is a portable information communication terminal, showing the appearance thereof.
Figure 2B:
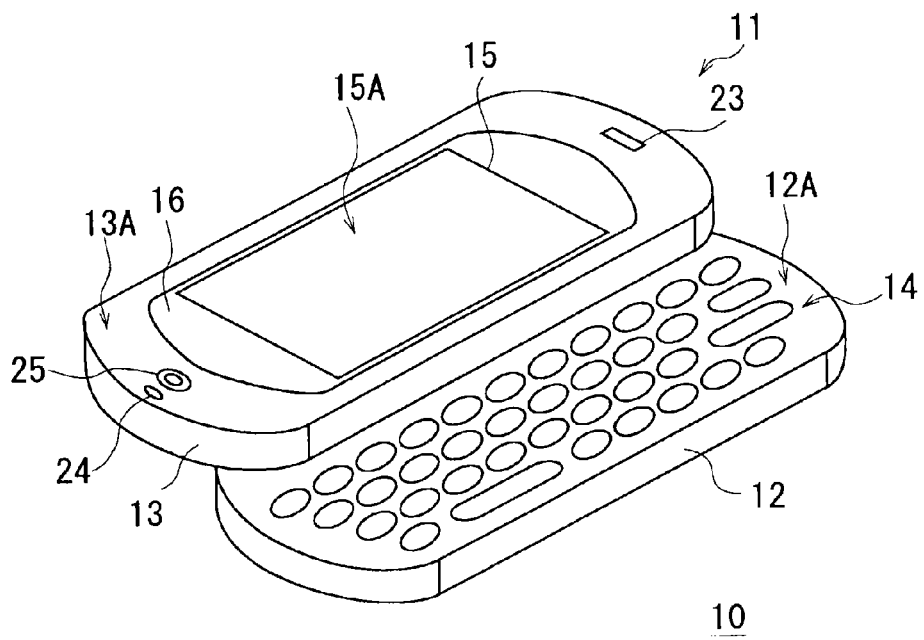

FIGS. 2A and 2B are schematic perspective views of the second embodiment of information processing apparatus, which is a portable information communication terminal 10, showing the appearance thereof. The information communication terminal 10 has an electronic mail feature that can realize transmission/reception of e-mail messages to and from external apparatus such as personal computers and other information communication terminals by way of the Internet.

Additionally, the information communication terminal 10 also has an Internet Protocol (IP) phone feature for realizing telephone conversations between the user and conversation partners by way of the Internet and external apparatus communication feature for realizing direct wired and wireless communications with external apparatus.

Still additionally, the information communication terminal 10 also has a data storage feature for acquiring music data and image data from servers on the Internet and external apparatus and storing them and a reproduction feature for reproducing any of the music data and/or the image data stored by means of the data storage feature for the user when the user wants to listen to music and/or watch images.

The information communication terminal 10 also has other features such as an information viewing feature for making the user able to view various pieces of information provided by servers on the Internet.

The size of the information communication terminal 10 is such that the user can hold it by a single hand. The information communication terminal 10 includes a flat, oblong and substantially rectangularly parallelepipedic terminal housing 11 whose opposite major surfaces show a contour like that of a race track and hence are long in one direction rather than in the direction orthogonal to it on the surfaces.

In the following description, the direction in which the terminal housing 11 is short is referred to as terminal transversal direction and the direction in which the terminal housing 11 is long is referred to as terminal longitudinal direction.

The terminal housing 11 includes a housing 12 that defines one of the opposite major surfaces (to be referred to as lower housing hereinafter) of the terminal housing 11 and a housing 13 that defines other major surface (to be referred to as upper housing hereinafter) of the terminal housing 11 and can slide relative to the housing 12 along the terminal transversal direction.

A plurality of keys 14, by means of which the user can input characters (alphabetical letters and Japanese hiraganas), numerals, signs and so on, are arranged on the upper surface 12A of the lower housing 12 that faces the upper housing 13.

As the upper housing 13 is driven to slide and laid on the upper surface 12A of the lower housing 12, it is integrally combined with the upper housing 13 to become the flat, oblong and substantially rectangularly parallelepipedic terminal housing 11 and hide the plurality of keys 14 from outside.

On the other hand, as the upper housing 13 is driven to slide and move away from the upper surface 12A of the lower housing 12, the plurality of keys 14 is exposed to function as a keyboard.

Therefore, as the upper housing 13 is driven to slide and move away from the lower housing 12 so as to expose the plurality of keys 14, the use can input various pieces of information such as the text of an e-mail message and/or a schedule by way of the plurality of keys 14 into the terminal housing 11.

The upper housing 13 has a display section 15 arranged at a central part of the upper surface 13A thereof, which also defines the upper surface of the terminal housing 11. The display section 15 includes a rectangular display screen 15A whose longitudinal direction (to be referred to as display surface longitudinal direction hereinafter) extending in parallel with the longitudinal direction of the terminal housing 11.

The terminal housing 11 displays the various pieces of information it acquires from an external apparatus or a server on the Internet on the display screen 15A of the display section 15 as an image so that the user can view the displayed information.

When the upper housing 13 is driven to slide and move away from the lower housing 12 and the lower housing 12 is operated as keyboard, the information such as a text input by way of the plurality of keys 14 of the lower housing 12 is also displayed as an image on the display screen 15A of the display section 15 so that the user can view the displayed information.

Still additionally, the terminal housing 11 can display an image of the graphic user interface (GUI) it has on the display screen 15A of the display section 15.

The upper housing 13 has a touch panel 16 larger than the display screen 15A of the display section 15 that shows a contour like that of a race track and is also arranged at a central part of the upper surface 13A thereof. The touch panel 16 is arranged to lie over the display screen 15A including the periphery thereof with its longitudinal direction (to be referred to as panel longitudinal direction hereinafter) extending in parallel with the longitudinal direction of the terminal housing 11.

While an image is being displayed on the display screen 15A of the display section 15, as a certain predetermined part of the image being displayed on the display screen is touched and depressed by a finger or a stylus pen by way of the touch panel 16 (an action of touching and depressing the surface of the touch panel 16 and is referred to as a touch hereinafter), a corresponding input is received by the terminal housing 11.

Figure 3:
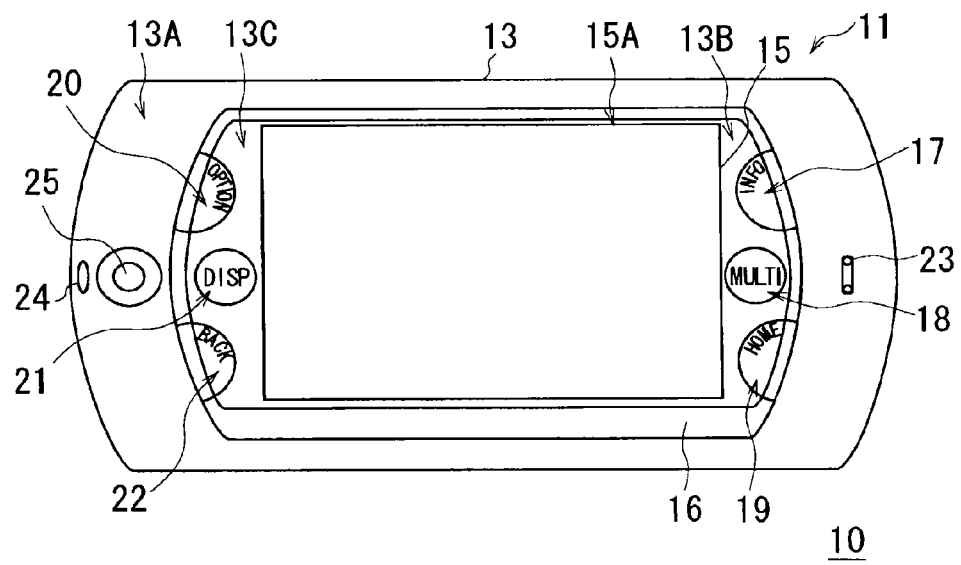
FIG. 3 is a schematic plan view of the information communication terminal of FIG. 2, showing a panel covering part at an end and a panel covering part at the opposite end thereof.

Additionally, as shown in FIG. 3, buttons 17 through 22 showing so many commands are arranged (drawn) in the part 13B and the part 13C of the upper surface 13A of the upper housing 13 that are covered by the touch panel 16 (to be referred to as the first end side panel-covered part and the second end side panel-covered part hereinafter) and located respectively at the first end side and at the second end side relative to the display screen 15A of the display section 15 in the longitudinal direction of the terminal.

More specifically, an information button 17 that corresponds to an information presentation command for showing the application program being executed is drawn for the command that the user can input in the first end side panel-covered part 13B.

Further, a multi window button 18 that corresponds to a multi window display command for displaying the plurality of windows on the display screen 15A of the display section 15 is drawn for the command that the user can input in the first end side panel-covered part 13B.

Similarly, a home button 19 that corresponds to a menu screen display command for displaying a main menu image, replacing the image currently being displayed on the display screen 15A of the display section 15, is also drawn for the command that the user can input in the first end side panel-covered part 13B.

On the other hand, an option button 20 that corresponds to a selected image overlap command for displaying a selected image related to the image currently being displayed on the display screen 15A of the display section 15 in an overlapping manner (or popup display) is drawn for the command that the user can input in the second end side panel-covered part 13C.

Similarly, a display button 21 that corresponds to an image defining image display command for displaying an image for defining the image to be displayed in terms of luminance, font of characters, etc. on the display screen 15A of the display section 15 is also drawn for the command that the user can input in the second end side panel-covered part 13C.

Additionally, a back button 22 for displaying the image that used to be displayed immediately before the image that is currently being displayed to replace the latter image on the display screen 15A of the display section 15 is also drawn for the command that the user can input in the second end side panel-covered part 13C.

Thus, any of the regions of the surface of the touch panel 16 located vis-à-vis the buttons 17 through 22 in the first end side panel-covered part 13B and the second end side panel-covered part 13C (to be referred to as button-facing regions hereinafter) is touched, the command that corresponds to the touched one of the button-facing regions and the corresponding one of the buttons 17 through 22 that faces the region is input to the terminal housing 11.

Additionally, the upper housing 13 is provided with a speaker 23 (FIGS. 2A, 2B and 3) arranged on the upper surface 13A and outside the touch panel 16 at the side of and at a position close to the first end in the longitudinal direction of the touch panel 16 (in other words, close to the first end of the upper surface 13A in the terminal longitudinal direction).

The upper housing 13 is also provided with a microphone 24 arranged on the upper surface 13A and outside the touch panel 16 at the side of and at a position close to the second end in the longitudinal direction of the touch panel 16 (in other words, close to the second end of the upper surface 13A in the terminal longitudinal direction).

Thus, the user can listen to the voice of the person at the other end of the communication channel that is output from the speaker 23 and talk to the person by way of the microphone 24 that collects the user's voice as the user, who is holding the terminal housing 11 by hand at the lower surface thereof, draws the speaker 23 and the microphone 24 close to one of his or her mouth respectively to successfully carry out a telephone conversation.

Still additionally, the upper housing 13 is provided with a four way directional pad 25 near the microphone 24 on the upper surface 13A. The four way directional pad 25 can be tilted at the pivot thereof and depressed for various operations.

For example, it may be so arranged that, as the four way directional pad 25 is tilted at the pivot thereof from the upright posture relative to the upper surface 13A of the upper housing 13, either of the transversally opposite directions of the terminal can be specified and input.

Similarly, it may be so arranged that, as the four way directional pad 25 is tilted at the pivot thereof from the upright posture relative to the upper surface 13A of the upper housing 13, either of the longitudinally opposite directions of the terminal can be specified and input.

It may also be so arranged that, as the four way directional pad 25 is depressed from the upper surface 13A of the upper housing 13 toward the lower housing 12 at the center and above the pivot thereof, a command is finalized and input.

Thus, as the four way directional pad 25 is tilted while an image is being displayed on the display screen 15A of the display section 15 of the terminal housing 11, the cursor on the display screen 15A of the display section 15 is driven to move and point a desired part on the display screen in response to the operation of tilting the four way directional pad 25.

Additionally, as the four way directional pad 25 is depressed at the center thereof, while an image is being displayed on the display screen 15A of the display section 15 of the terminal housing 11 and the cursor is pointing an icon on the display screen 15A, the selection of the icon is finalized and the command that corresponds to the icon is input.

Figure 4:
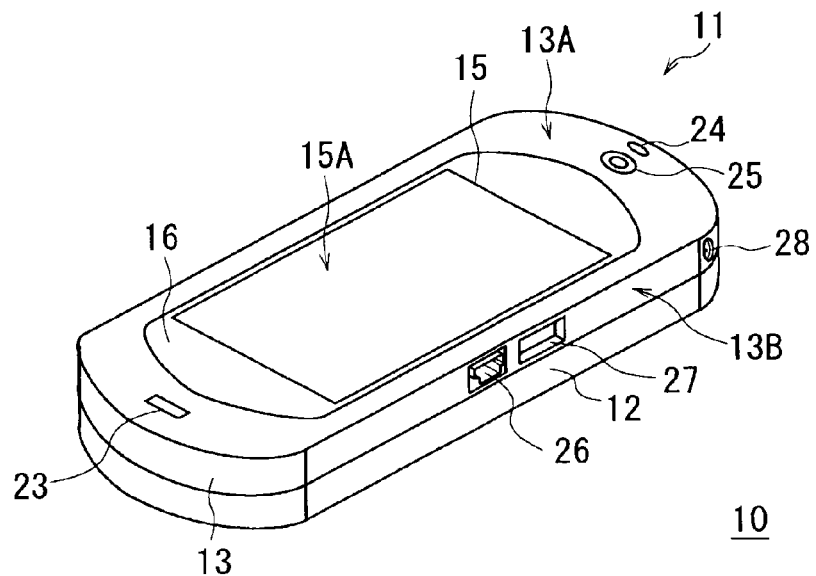
FIG. 4 is a schematic perspective view of the upper housing of the information communication terminal of FIG. 2, showing the configuration of a lateral side thereof.

As shown in FIG. 4, a universal serial bus (USB) connector 26 and a connector jack 27 are juxtaposed in a central part of one of the lateral surface 13B of the upper housing 13 running in parallel with the terminal longitudinal direction.

Thus, a USB cable (not shown) can be connected to the USB connector 26 of the terminal housing 11 for wired connections with external apparatus.

Additionally, a headset or a headphone (both not shown) having a sound input/output feature can be connected to the connector jack 27 of the terminal housing 11.

As a headset is connected to the connector jack 27 of the terminal housing 11, the user can talk to the person at the other end of the communication channel by way of the headset instead of the speaker 23 and the microphone 24, which are described above.

A direct current (DC) jack 28 for feeding power from a direct current power source is also arranged on the lateral surface 13B of the upper housing 13.

As the terminal housing 11 is connected to a commercial power supply by way of an alternating current/direct current (AC/DC) adaptor (not shown) connected to the DC jack 28, it is driven to operate or its battery (not shown) is electrically charged by the DC power supplied from the commercial power supply by way of the (AC/DC) adaptor.

(2-2) Internal Configuration of Information Communication Terminal

Figure 5:
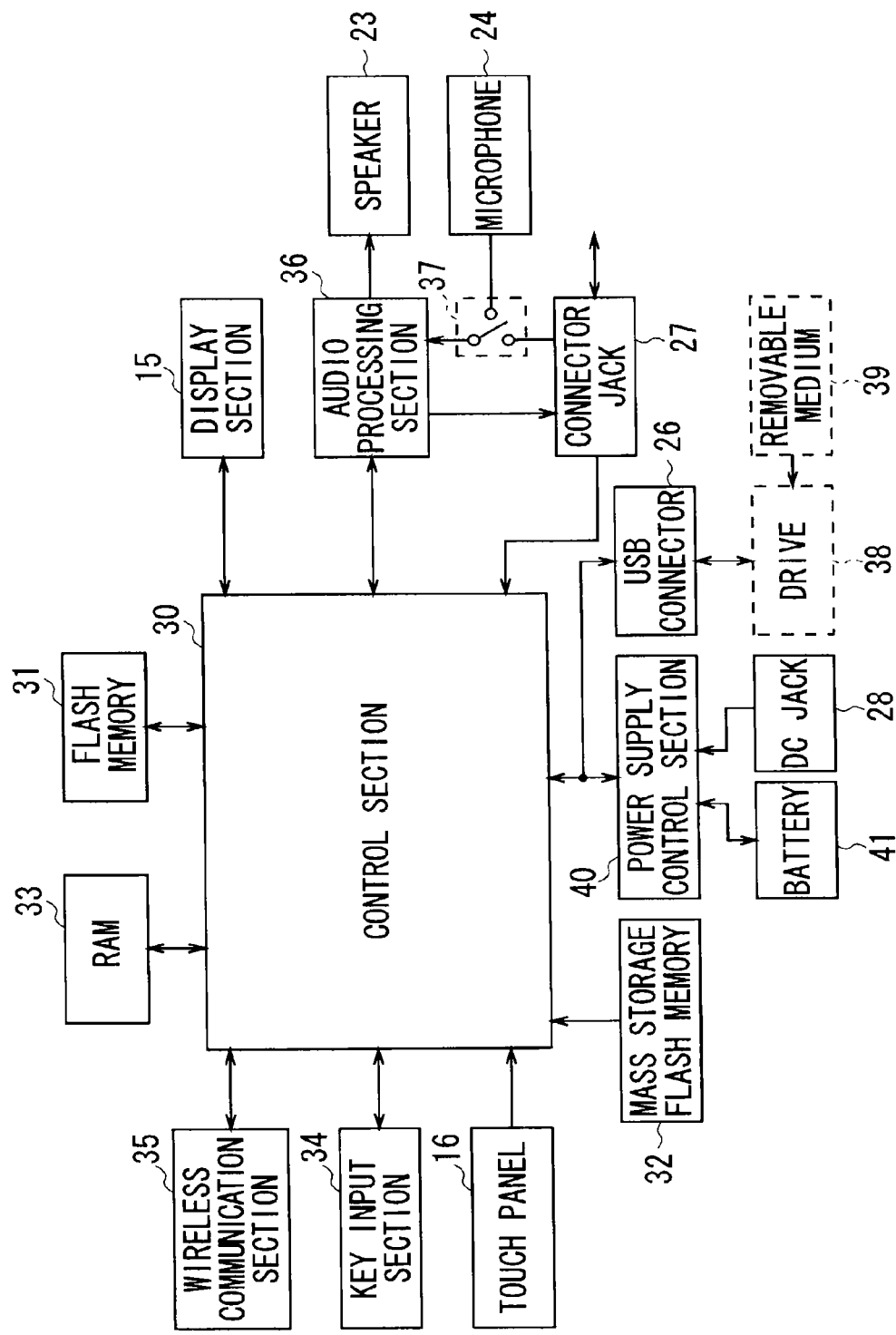
FIG. 5 is a schematic hardware block diagram of the information communication terminal of FIG. 2, showing the circuit configuration thereof.

Now, the circuit configuration of the above-described information communication terminal 10 will be described below. Referring to FIG. 5, the information communication terminal 10 has a control section 30 formed by using a microprocessor.

The control section 30 reads out various programs including the basic program and any of the various application programs stored in a flash memory 31 or a mass storage flash memory 32 and develops them on a random access memory (RAM) 33, which may be a synchronous dynamic random access memory (DRAM), to control the entire information communication terminal 10 and execute various processes.

Thus, the control section 30 can realize one of the above-described various features of the information communication terminal 10 including the electronic mail feature, the IP phone feature, the feature of communicating with external apparatus, the data storage feature, the reproduction feature, information viewing feature, the instant messenger feature, the chat feature and so on by itself.

Additionally, the control section 30 can realize a plurality of features concurrently in parallel by executing a plurality of application programs also concurrently in parallel.

More specifically, when position detecting data that corresponds to the position where the touch panel 16 is touched (to be referred to as touch position hereinafter) is given to the control section 30, it detects the touch position on the surface of the touch panel 16 as the coordinates of a point on the surface according to the position detecting data.

Then, the control section 30 determines if a command is assigned to the coordinates on the display screen, the first end side panel-covered part 13B or the second end side panel-covered part 13C that correspond to the detected touch position or not and, if it determines that a command is assigned to them, it executes a process according to the command, which process may be a process of controlling the image (e.g., a GUI image) to be displayed on the display screen 15A of the display section 15 or a process of communicating with an external apparatus.

Note that, when the control section 30 realizes one or more than one of the above listed features and the user operates the key input section 34 having the above-described plurality of keys and the four way directional pad 25 so that operation data that corresponds to the above operation is given to the control section 30 from the key input section 34, the control section 30 executes one or more than one processes according to the operation data.

Thus, for example, the control section 30 can directly communicate with an external apparatus, which may be a personal computer or some other information communication terminal, by means of the wireless communication section 35 and the wireless local area network (WLAN) feature that conforms to the 802.11 Standard.

Additionally, for example, the control section 30 can communicate with an external apparatus such as personal computer, some other information communication terminal or a server on the Internet by the wireless communication section 35 and by way of an access point and the Internet.

When the control section 30 acquires viewable information as data by way of the wireless communication section 35 for forming an image to be displayed on the display screen, it sends out the data for forming an image to the display section 15 and has the display screen 15A of the display section 15 display the image formed according to the data so that the user can view the viewable information.

When the control section 30 receives music data and/or image data by way of the wireless communication section 35 as a result of communication with an external apparatus or a server, it sends out the music data and/or the image data to the mass storage flash memory 32 and stores them there.

When the control section 30 reproduces such image data, it reads out the image data from the mass storage flash memory 32 and executes predetermined reproduction processes including a decoding process on the image data before it sends out the data to the display section 15. As a result, the control section 30 can display the image on the display screen 15A of the display section 15 according to the image data and have the user watch it.

The control section 30 is connected to the above-described connector jack 27, which connector jack 27 is provided with, for example, a plurality of connection pins.

The connector jack 27 detects if a headset or a headphone is connected to it according to the presence or absence of the related connection pins connected to the terminal of an external connector and notifies the control section 30 of the outcome of detection.

Thus, when the control section 30 reproduces music data, it reads out the music data from the mass storage flash memory 32 and sends them out to the audio processing section 36. The audio processing section 36 executes reproduction processes including a decoding process, a digital/analog conversion process and an amplification process on the music data and produces a music signal.

Then, if no headphone is connected to the connector jack 27, the audio processing section 36 sends out the music signal to the speaker 24 under the control of the control section 30 in order to output the music of the music signal from the speaker 24 so that the user can listen to the music.

If, on the other hand, a headphone is connected to the connector jack 27, the audio processing section 36 sends out the music signal to the headphone by way of the connector jack 27 under the control of the control section 30 in order to output the music of the music signal from the headphone so that the user can listen to the music.

If no headset is connected to the connector jack 27 when the user is talking with the person at the other end of the communication channel of IP phone, the control section 30 takes in the audio signal that is obtained by collecting the user's voice by means of the microphone by way of a switching section 37.

Then, the audio processing section 36 executes predetermined processes including an analog/digital conversion process on the audio signal to produce audio data and sends out the audio data it produces to the control section 30.

Thus, the control section 30 transmits the audio data to the information communication terminal that the person at the other end of the communication channel has by the wireless communication section 35 by way of an access point and the Internet.

Then, the control section 30 receives and takes in the audio data of the voice of the person at the other end of the communication channel by means of the wireless communication section 35 and sends out the data that are taken in to the audio processing section 36.

At this time, the audio processing section 36 executes predetermined processes including a digital/analog conversion process and an amplification process on the audio data to produce an audio signal and sends out the audio signal it produces to the speaker 23 under the control of the control section 30 to output the voice of the person at the other end of the communication channel from the speaker according to the audio signal.

If, on the other hand, a headset is connected to the connector jack 27 when the user is talking with the person at the other end of the communication channel of IP phone, the control section 30 takes in the audio signal that is obtained by collecting the user's voice by means of the microphone installed in the headset by way of the connector jack 27 and the switching section 37.

Then, the audio processing section 36 executes predetermined processes including an analog/digital conversion process on the audio signal to produce audio data and sends out the audio data it produces to the control section 30.

Thus, the control section 30 transmits the audio data to the information communication terminal that the person at the other end of the communication channel has by the wireless communication section 35 by way of an access point and Internet.

Then, the control section 30 receives and takes in the audio data of the voice of the person at the other end of the communication channel transmitted from the information communication terminal by means of the wireless communication section 35 and sends out the audio data that are taken into the audio processing section 36.

At this time, the audio processing section 36 executes predetermined processes including a digital/analog conversion process and an amplification process on the audio data to produce an audio signal and sends out the audio signal it produces to the headphone of the headset sequentially by way of the switching section 37 and the connector jack 27 under the control of the control section 30 to output the voice of the person at the other end of the communication channel from the headphone of the headset according to the audio signal.

When the information communication terminal 10 receives an incoming call of IP phone, the control section 30 sends out the data of the ringing tone (or the ringer) to the speaker 23 as a ringing tone signal by way of the audio processing section 36 or to the headphone of the headset sequentially by way of the switching section 37 and the connector jack 27 so as to make the speaker 23 or the headphone of the headset, whichever appropriate, output a ringing tone and notifies the user of the incoming call.

The mass storage flash memory 32 stores the data generated according to various application programs such as registration information on other users that are to be used when exchanging information with other users by means of a tool selected from the instant messenger, the IP phone, the chat, the electronic mail and so on in addition to music data and image data.

Additionally, the mass storage flash memory 32 also stores registration information on the user him- or herself (and his or her information communication apparatus) that is to be transmitted to the information communication apparatus that other user possess.

Besides external apparatus such as a personal computer or some other information communication terminal, the USB connector 26 can also be connected to a drive 38 by way of a USB cable.

The control section 30 can take in the computer program read out from a removable medium 39 mounted on the drive 38, which may be a magnetic disk, an optical disk, a magneto-optical disk or a semiconductor memory, by way of the USB connector 26 and install it in the flash memory 31 or the mass storage flash memory 32.

Additionally, when direct current power is being supplied to the information communication terminal 10 from outside by way of the DC jack 28, the control section 30 can operate the various sections of the information communication terminal 10 by taking in the direct current into a power supply control section 40 and supplying it to those sections.

Furthermore, when direct current power is being supplied to the information communication terminal 10 from outside by way of the DC jack 28, the control section 30 can charge a battery 41 mounted on the information communication terminal 10 by taking in the direct current into power supply control section 40.

Still additionally, when no direct current power is being supplied to the information communication terminal 10 from outside, the control section 30 can operate the various sections of the information communication terminal 10 by taking in the direct current supplied from the battery 41 into the power supply control section 40 and supplying it to those sections.

Furthermore, when the information communication terminal 10 is connected to a personal computer, for instance, by way of the USB connector 26, the control section 30 can operate the various sections of the information communication terminal 10 by taking in the direct current supplied from the personal computer into the power control section 40 once and supplying it to those sections.

Note that the above-described information communication terminal 10 shows an exemplar mode of realization of the above-described information processing apparatus 1 of the first embodiment, using hardware. More specifically, the functional features of display control section 3, command assigning section 5 and priority defining/assigning section 6 of the information processing apparatus 1 are realized by the control section 30 of the information communication terminal 10 and the functional feature of command input section 4 of the information processing apparatus 1 is realized by the touch panel 16 of the information communication terminal 10.

(2-3) GUI of Information Communication Terminal

Now, the GUI of the information communication terminal 10 will be described below. The GUI is mainly realized by the control section 30, the display section 15 and the touch panel 16. More specifically, the GUI is designed to cause the user to do input operations by means of the touch panel 16 for the multi-window type image being displayed on the display section 15.

Figure 6:
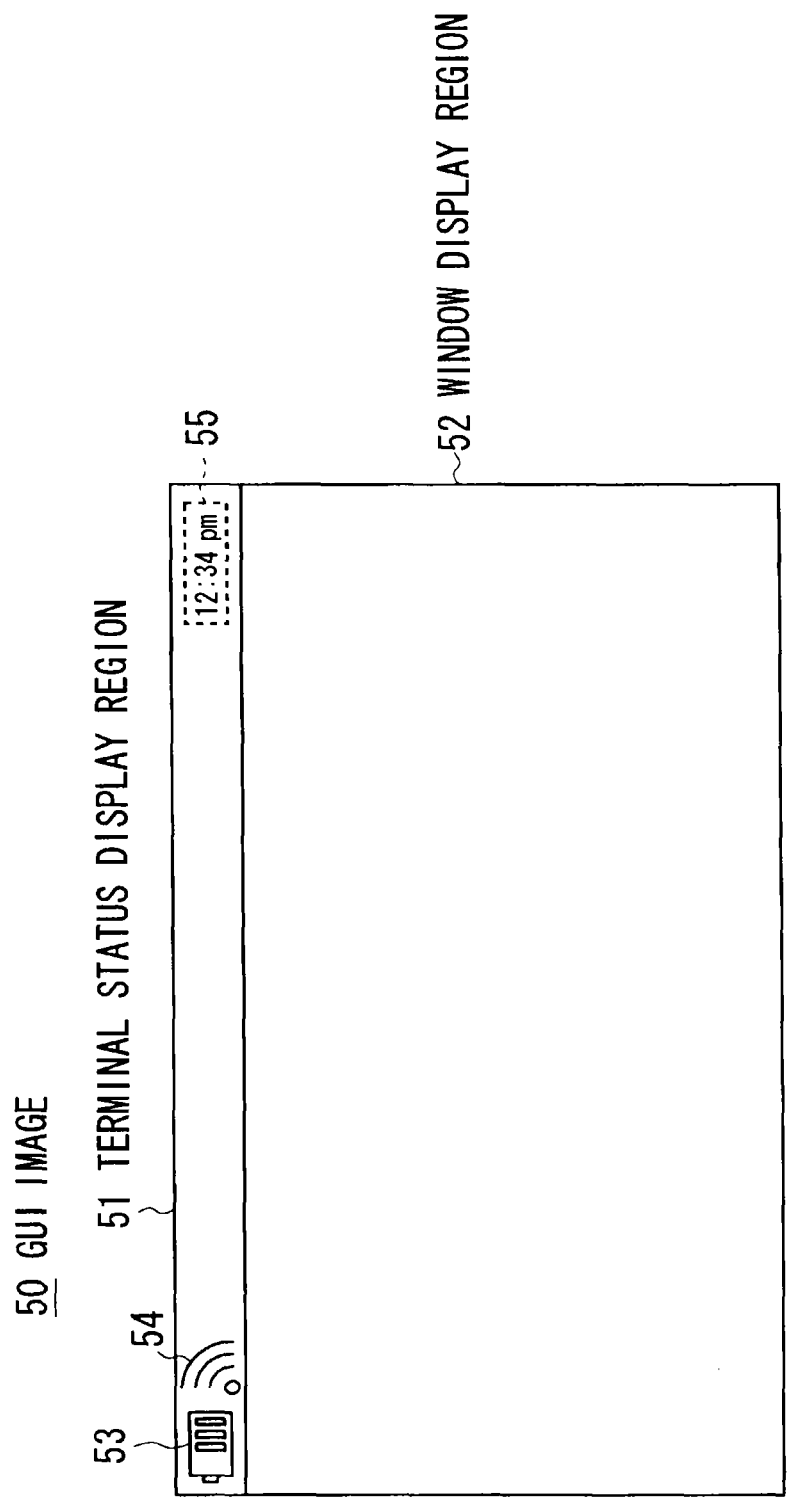
FIG. 6 is a schematic illustration of arrangement (1) of GUI image.

As shown in FIG. 6, the image of a GUI (GUI image) 50 shows a rectangular contour and includes a strip-shaped region 51 arranged along the upper edge of the display screen and a region 52 that takes the rest. The GUI image 50 is displayed on the display screen 15A of the display section 15 as the multi-window button 18 is depressed and the control section 30 controls the display operation.

The region 51 of the GUI image 50 shows various pieces of information indicating the current status of the information communication terminal 10 and will also be referred to as terminal status display region hereinafter. On the other hand, the region 52 is a region where a window that corresponds to the application program being executed is displayed (in other words a window that is displayed when an application program is started and will also be referred to as application window hereinafter) and will also be referred to as window display region.

More specifically, the terminal status display region 51 displays a remaining battery power icon 53 showing the remaining power of the battery of the information communication terminal 10, an electric wave intensity icon 54 indicating the intensity of the electric wave of the WLAN and the current clock time 55 among others.

Figure 7:
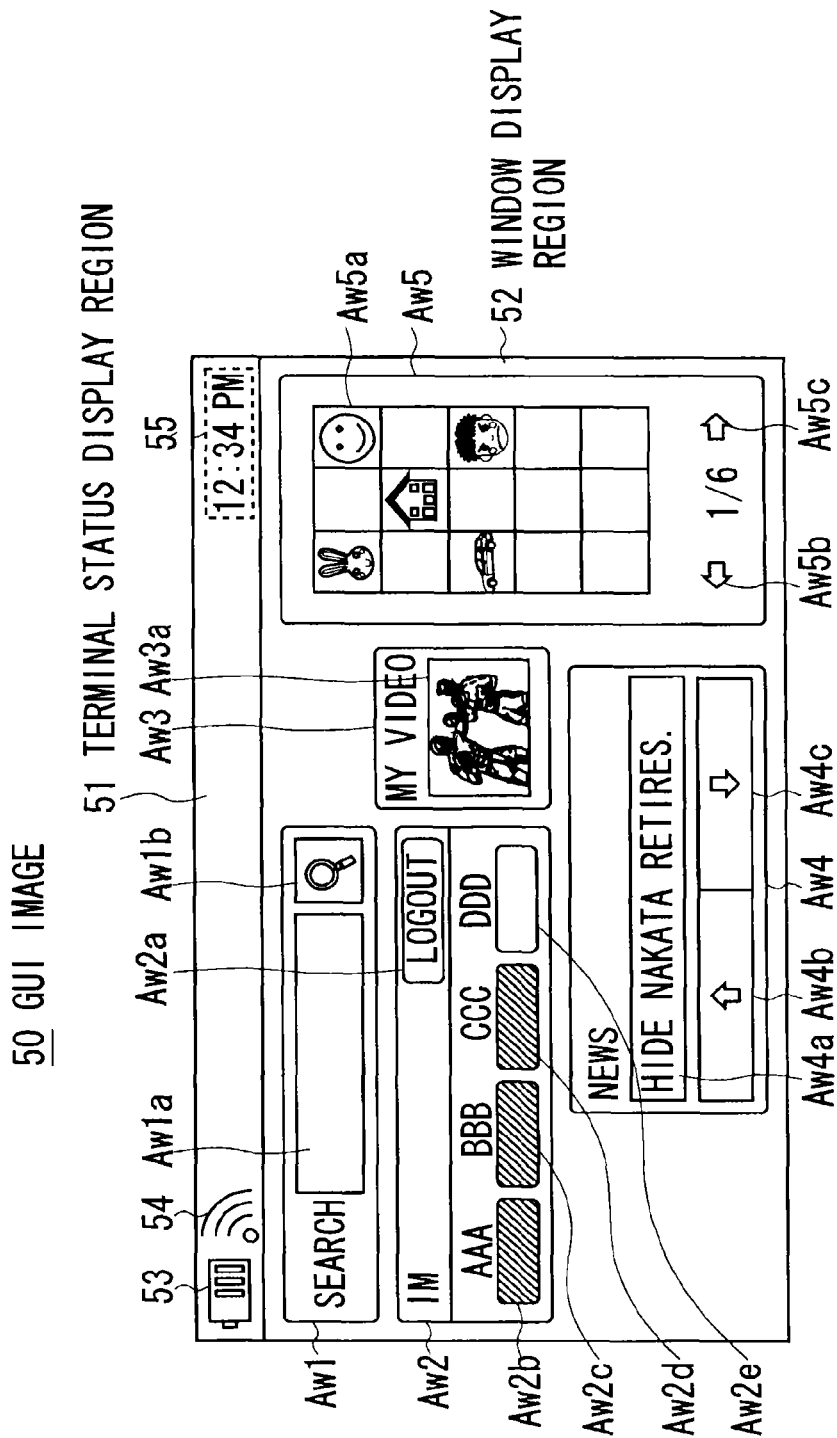
FIG. 7 is a schematic illustration of arrangement (2) of GUI image.

On the other hand, as a plurality of application programs are started, the window display region 52 displays a plurality of application windows Aw that correspond to the application programs, as shown in FIG. 7.

As an example, five application windows Aw1 through Aw5 are being displayed in the window display region 52 of the GUI image 50 illustrated in FIG. 7.

Of these windows, the application window Aw1 is a window for a search application and shows an input box Aw1a for inputting a search keyword and an icon Aw2a to which the command for searching information related to the keyword input to the input box Aw1a is assigned.

The application window Aw2 is a window for an instant messenger application and shows an icon Aw2a to which the command for logging in the service of instant messenger and the command for logging out the service are assigned and images Aw2b through Aw2e that show each of other users has logged in the service or not.

The application window Aw3 is a window for a moving image reproduction application and shows a display region Aw3a for displaying the moving image reproduced by the information communication terminal 10.

The application window Aw4 is a window for a news display application and shows a display region Aw4a for displaying the news acquired from the Internet and icons Aw4b and Aw4c to which the command for switching the news to be displayed in the display region Aw4a is assigned.

The application window Aw5 is a window for an image list display application and shows a display region Aw5a for displaying a list of the images stored in the information communication terminal 10 and icons Aw5b and Aw5c to which the command for switching the image to be displayed in the display region Aw5a is assigned.

The user can select any of objects including the icons that are arranged in the application windows Aw and operate it by touching the selected object being displayed.

Thus, the information communication terminal 10 can provide a plurality of functional features including the Internet search feature, the instant messenger feature, the moving image reproduction feature and the news display feature and an image list display feature to the user at the same time by way of the application window Aw.

The mode in which application windows Aw are displayed in a state where the objects in the application windows Aw are operable is referred to as active mode.

On the other hand, the mode in which the objects in the application windows Aw that are being displayed are no longer operable but the user can select and set application programs and application windows Aw is referred to as selection/setting mode.

There is also a mode in which an application program can be installed or uninstalled. This mode is referred to as installation mode.

Now, of these modes, the selection/setting mode will be described in detail below.

(2-4) Selection/Setting Mode

As the item of "selection/setting mode" is selected from the popup menu (not shown) that is displayed on the GUI image 50 when the option button 20 is depressed in the active mode, the active mode is switched to the selection/setting mode.

Figure 8:
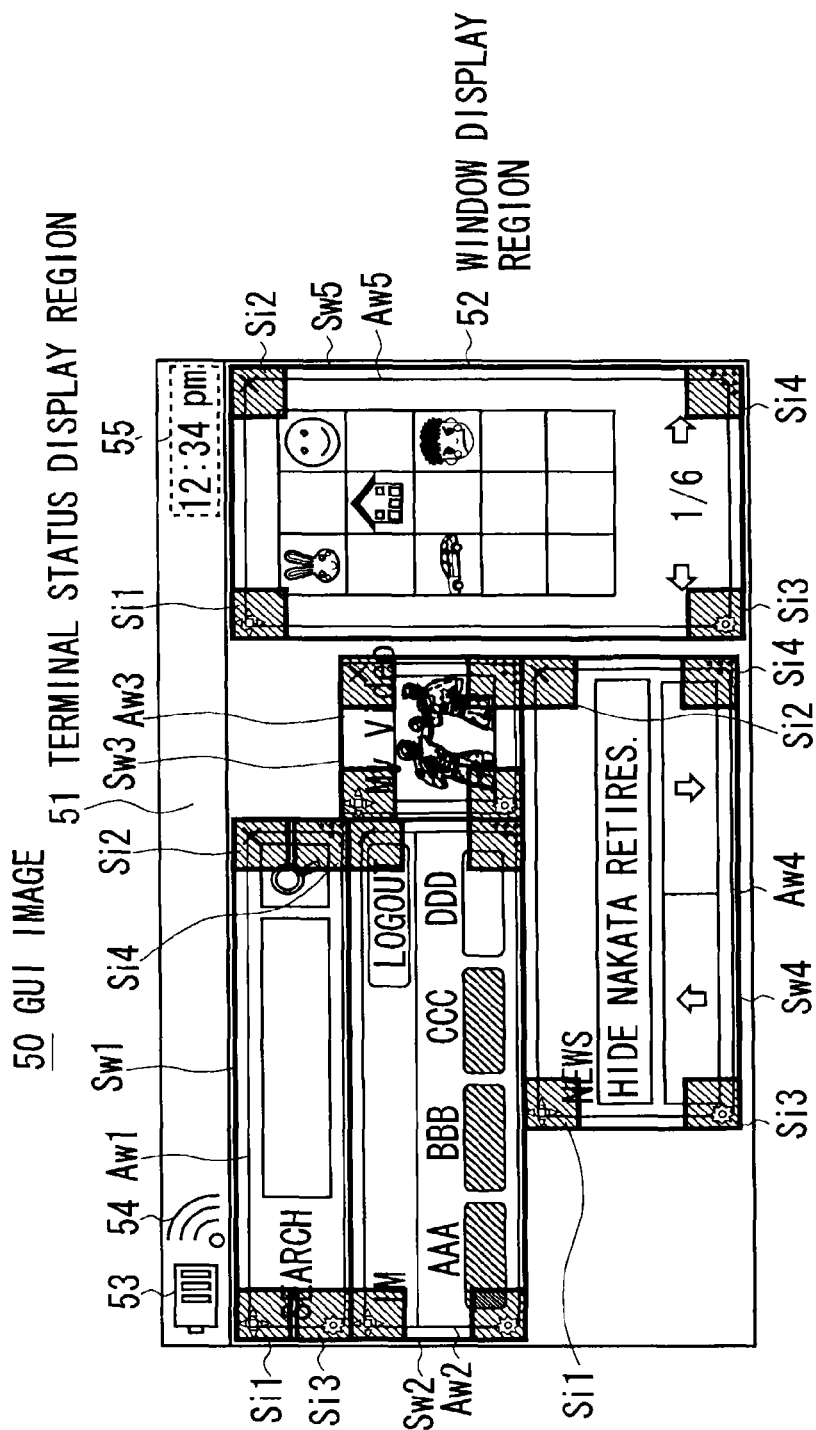
FIG. 8 is a schematic illustration of arrangement (3) of GUI image.

As this mode is selected, windows Sw for various selections/settings (to be also referred to as selection/setting windows hereinafter) are displayed on the respective application windows Aw being displayed on the GUI image 50 (the application windows Aw being displayed in the active mode) with the respective sizes substantially same as those of the application windows Aw as shown in FIG. 8.

The selection/setting windows Sw and the underlying application windows Aw are related to each other respectively and a window operation (for moving the window, altering the window size etc.) performed on a selection/setting window Sw is also applied to the underlying application window Aw. An application window Aw can be added or deleted freely in this selection/setting mode.

FIG. 8 illustrates a GUI image 50 displaying five selection/setting windows Sw1, Sw2, Sw3, Sw4 and Sw5 that are laid on five application windows Aw1, Aw2, Aw3, Aw4 and Aw5 respectively as an example.

The selection/setting windows Sw are transparent except their contour lines so that the underlying application windows Aw are visible but the objects in the application windows Aw are inoperable. The contour lines of the selection/setting windows Sw are drawn in an eye catching color (e.g., in orange) relative to the underlying application windows Aw.

Square icons Si to be used for various selection/setting operations for the application programs and the application windows Aw are arranged at the four corners of the selection/setting windows Sw (to be also referred to as selection/setting icons hereinafter). The arrangement of selection/setting icons Si is common to all the selection/setting windows Sw. The selection/setting icons Si are translucent and marks that schematically illustrate the commands assigned to the respective icons are shown on them.

More specifically, in each selection/setting window Sw, move icon Si1 to which the command for shifting the display position of each selection/setting window Sw with the underlying application icon Aw is assigned is arranged at the upper left corner and closing icon Si2 to which the command for closing the selection/setting window Sw with the underlying application window Aw is assigned is arranged at the upper right corner while property icon Si3 to which the command for displaying a property image of the correspond application is assigned is arranged at the lower left corner and size change icon Si4 to which the command for changing the display size of the selection/setting window Sw and that of the underlying application window Aw is assigned is arranged at the lower right corner.

Figure 9A:
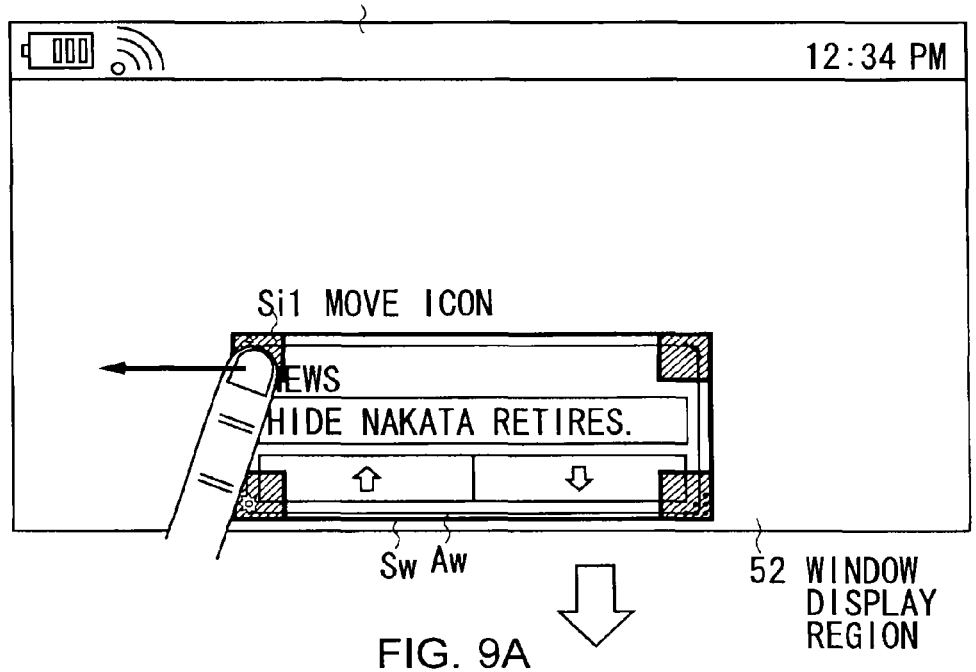
FIGS. 9A and 9B are schematic illustrations of a move of a selected window.
Figure 9B:
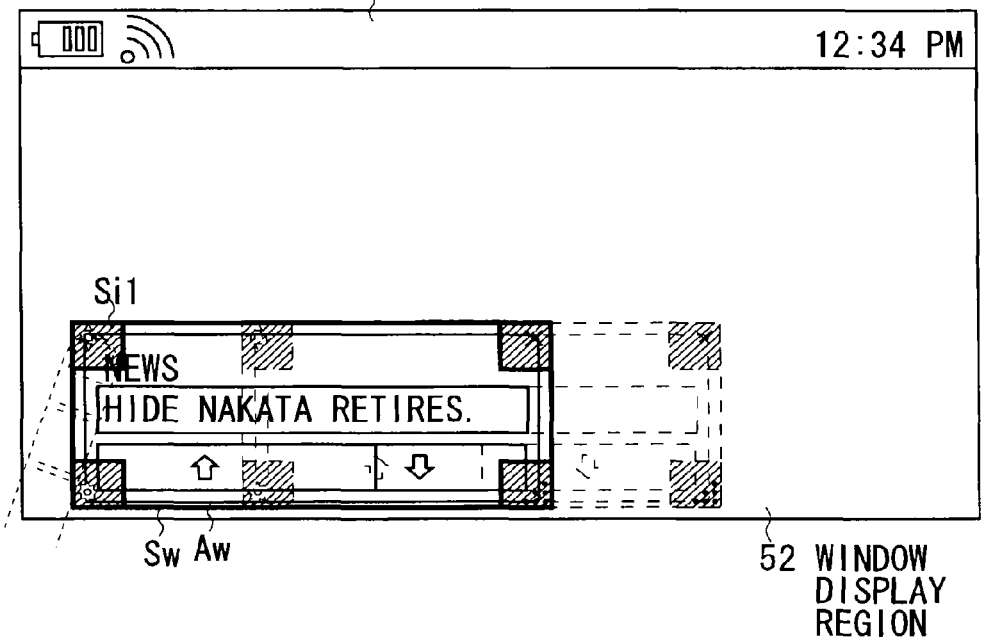

In the selection/setting mode, as the user touches the display area of the move icon Si1 arranged at the upper left corner of a selection/setting window Sw on the display screen 15A by means of a finger (or a pen), slides the finger in a desired direction, keeping the finger held in touch with the display screen 15A, and moves the finger away from the display screen 15A, the selection/setting window Sw is moved in the desired direction in the window display region 52 along with the underlying application window Aw as illustrated in FIGS. 9A and 9B.

Figure 10A:
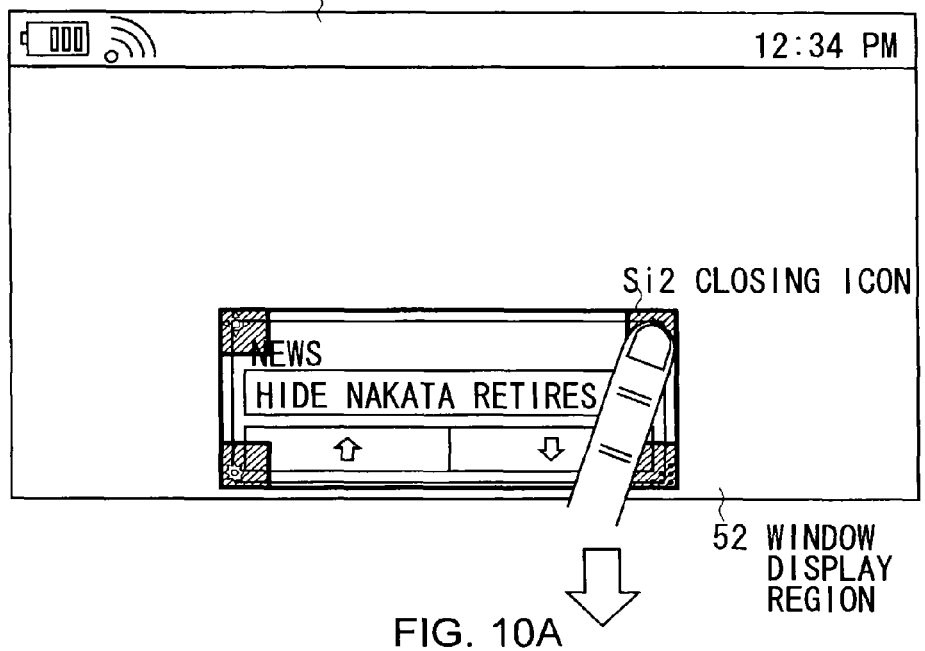
FIGS. 10A and 10B are schematic illustrations of erasure of a selected window.
Figure 10B:
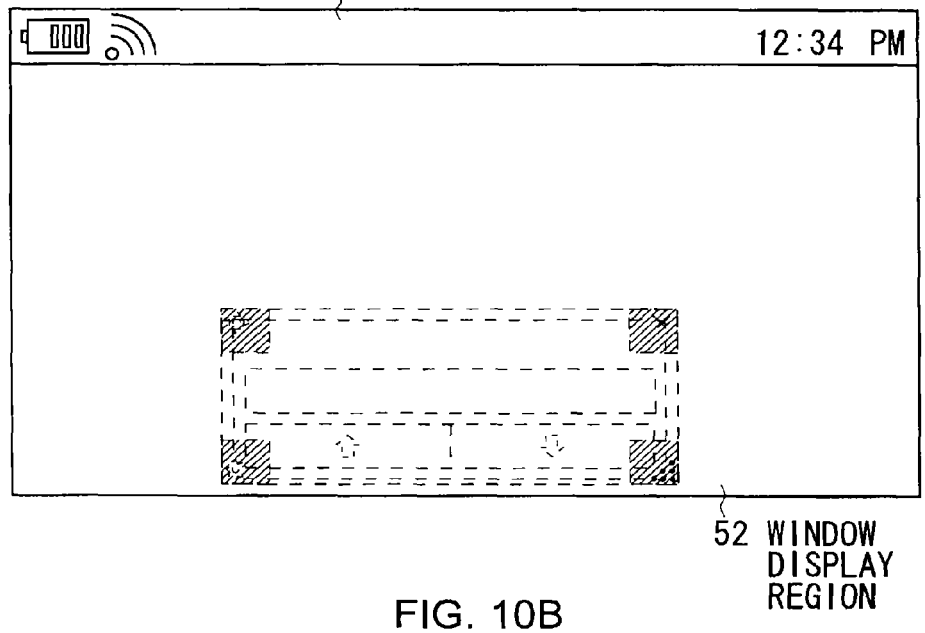

Additionally, for example, as the user touches the display area of the closing icon Si2 arranged at the upper right corner of a selection/setting window Sw on the display screen 15A by means of a finger and then moves the finger away from the display screen 15A, the selection/setting window Sw and the underlying application window Aw are closed (and hence erased from the window display region 52) as illustrated in FIGS. 10A and 10B.

Figure 11A:
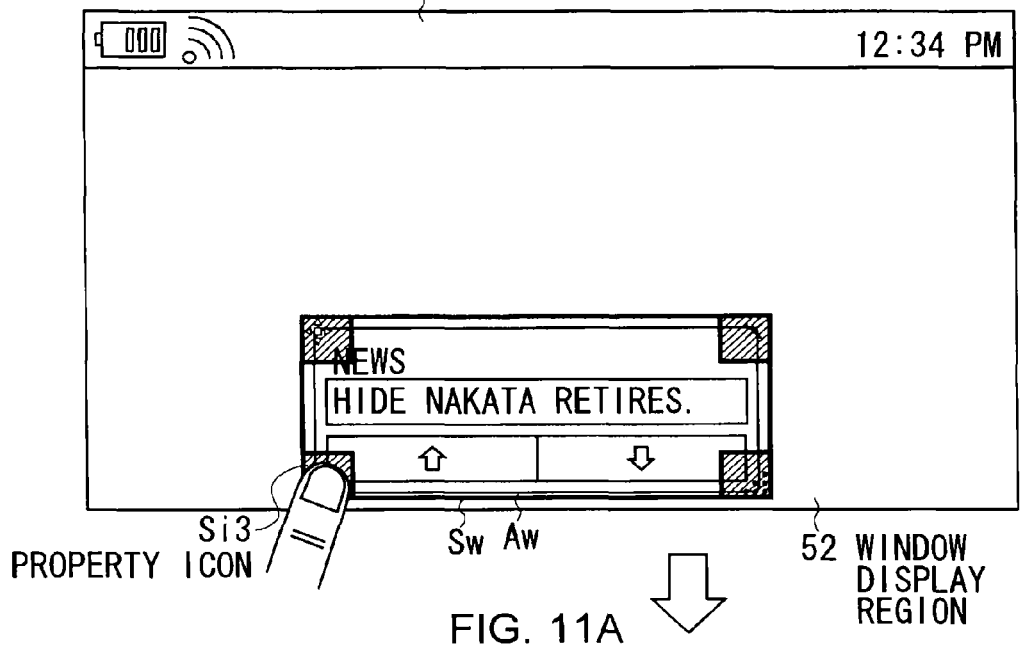
FIGS. 11A and 11B are schematic illustrations of display of a property window.
Figure 11B:
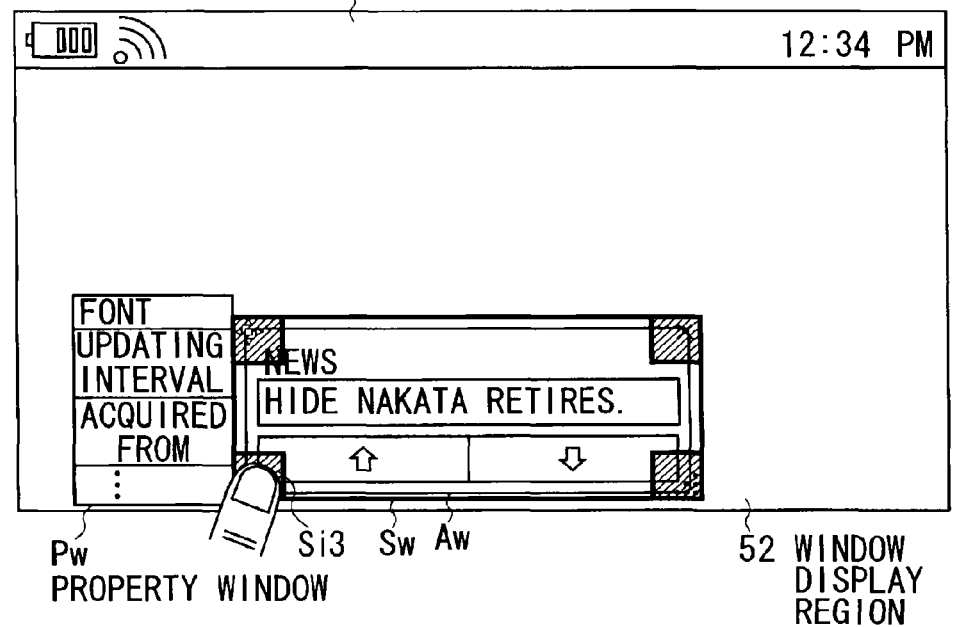

Still additionally, as the user touches the display area of the property icon Si3 arranged at the lower left corner of a selection/setting window Sw on the display screen 15A, the property window Pw of the corresponding application window Aw is displayed on the display screen as illustrated in FIGS. 11A and 11B.

Figure 12A:
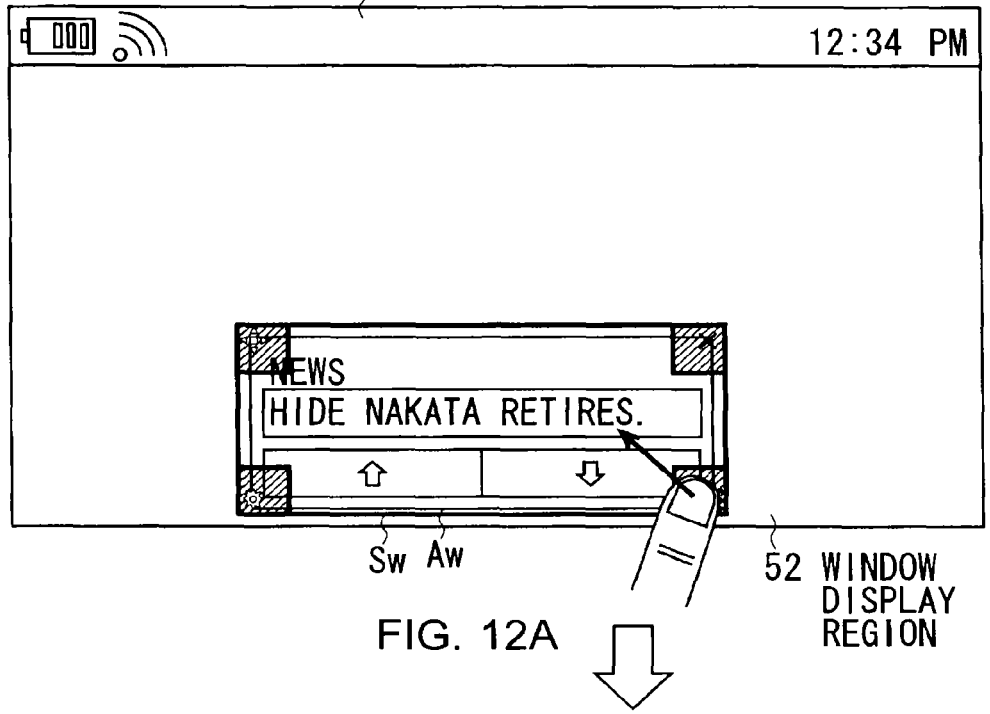
FIGS. 12A and 12B are schematic illustrations of change (1) of the display size of a selected window.
Figure 12B:
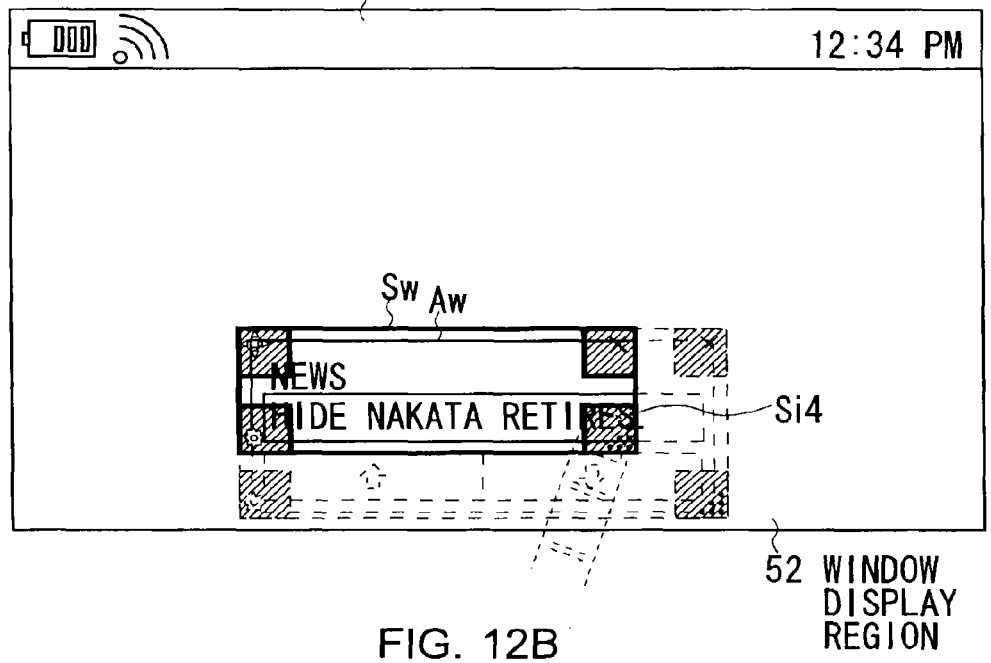
Figure 13A:
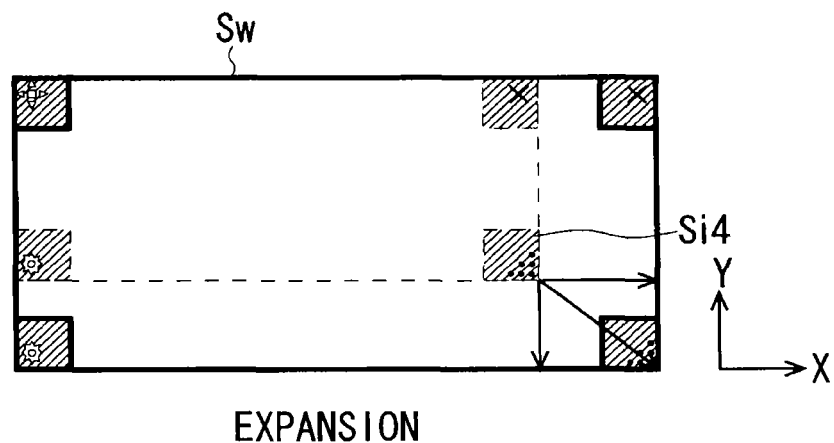
FIGS. 13A and 13B are schematic illustrations of change (2) of the display size of a selected window.
Figure 13B:
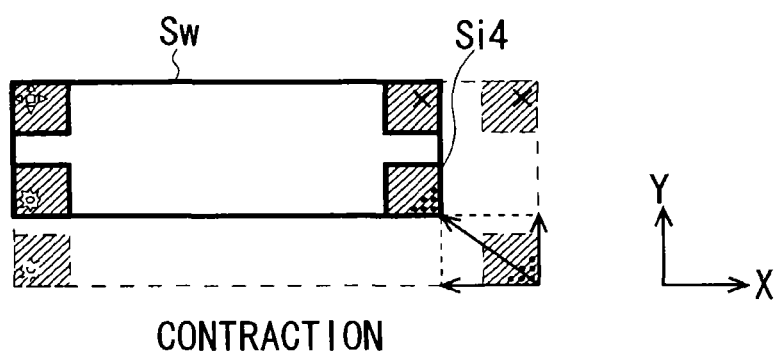

Furthermore, as the user touches the display area of the size alteration icon Si4 arranged at the lower right corner of a selection/setting window Sw on the display screen 15A by means of a finger as shown in FIGS. 12A and 12B, display size of the application window Aw can be changed along with the selection/setting window Sw.

In actuality, as the user touches the display area of the size alteration icon Si4 by means of a finger for the purpose of alteration of the size of the window, firstly the vertex diagonal relative to the position of the size alteration icon Si4 (the upper left vertex in this case) on the selection/setting window Sw is fixed.

Then, as the user slides the finger touching the display area of the size change icon Si4 in a desired direction under this condition and moves it away from the display screen 15A, the horizontal component of the distance by which the sliding finger moved (in the direction of the X-axis) is recognized as the quantity by which the selection/setting window Sw is expanded or contracted in the horizontal direction (in the direction of the X-axis) and the vertical component of the distance by which the sliding finger moved (in the direction of the Y-axis) is recognized as the quantity by which the selection/setting window Sw is expanded or contracted in the vertical direction (in the direction of the Y-axis). Thus, the display size of the selection/setting window Sw is changed accordingly. As the display size of the selection/setting window Sw is changed, the display size of the underlying application window Aw is also changed accordingly.

The display size of a selection/setting window Sw and that of the underlying application window Aw can be changed in this way.

Additionally, in the selection/setting mode, an action of touching a part of a selection/setting window Sw other than the selection/setting icons Si thereof by means of a finger and sliding the finger in a desired direction, holding it in touch with the display screen, gives rise to an effect of moving the selection/setting window Sw and the underlying application window Aw in a desired direction in the window display region 52 same as an action of touching the move icon Sit and sliding the finger, holding it in touch with the display screen.

Figure 14A:
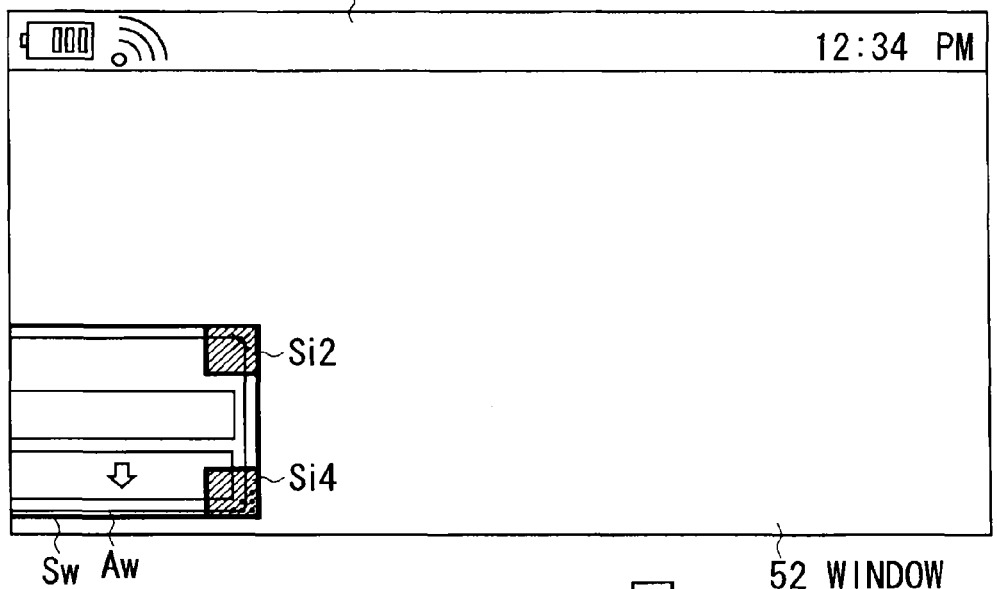
FIGS. 14A and 14B are schematic illustrations of a rearrangement of a selected icon.
Figure 14B:
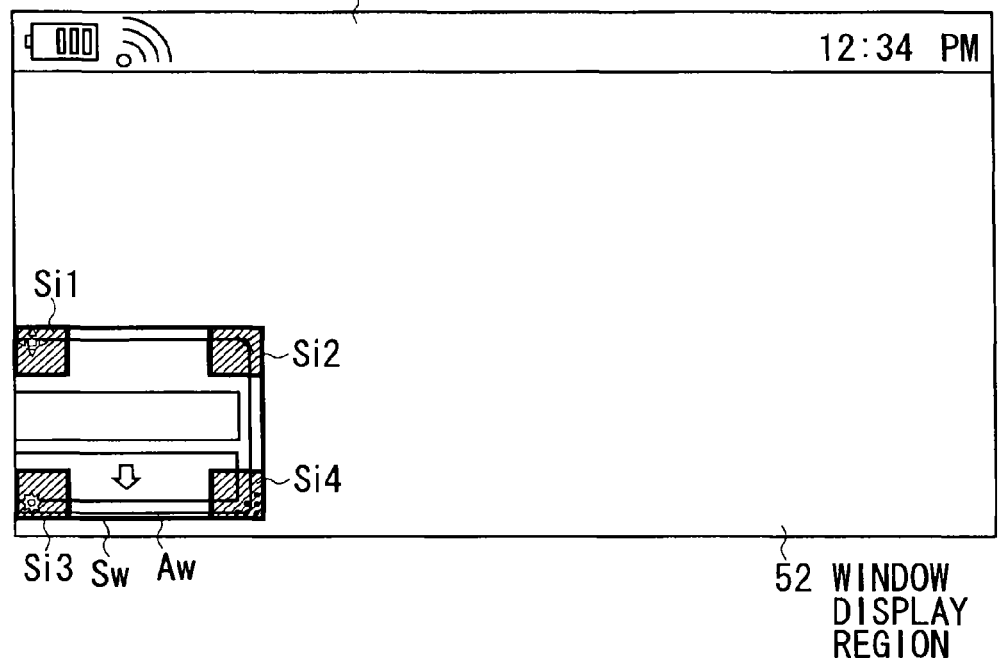

Still additionally, when a selection/setting window Sw partly moves out of the window display region 52 so that some of the selection/setting icons Si are no longer displayed as a result of moving the selection/setting window Sw in a desired direction in the window display region 52 as shown in FIG. 14A, the disappeared selection/setting icons Si can be moved back into the part of the selection/setting window Sw that is being displayed so as to display all the selection/setting icons Si in that part of the selection/setting window Sw as shown in FIG. 14B.

For example, when a left half of a selection/setting window Sw moves out of the window display region 52 so that the move icon Si1 and the property icon Si3 that are arranged in the left half disappear, the move icon Si1 can be moved to the upper left corner of the part of the selection/setting window Sw that is being displayed and the property icon Si3 can be moved to the lower left corner of the part of the selection/setting window Sw that is being displayed to make them reappear.

With this arrangement, if a selection/setting window Sw partly disappears as a result of moving the window Sw in the selection/setting mode, a situation where some of the selection/setting icons Si disappear is avoided and the user can constantly use all the selection/setting icons Si.

In the selection/setting mode, when a selection/setting window Sw having a small display size is hidden under some other selection/setting window Sw having a large display size (and under the application window Aw of the large display size lying under the large selection/setting window Sw to be accurate) and becomes invisible as a result of moving either of the selection/setting windows Sw, the color of the large selection/setting window Sw is changed (from orange to red for example) to notify the user that the small selection/setting window Sw is hidden under the large selection/setting window Sw.

Figure 15A:
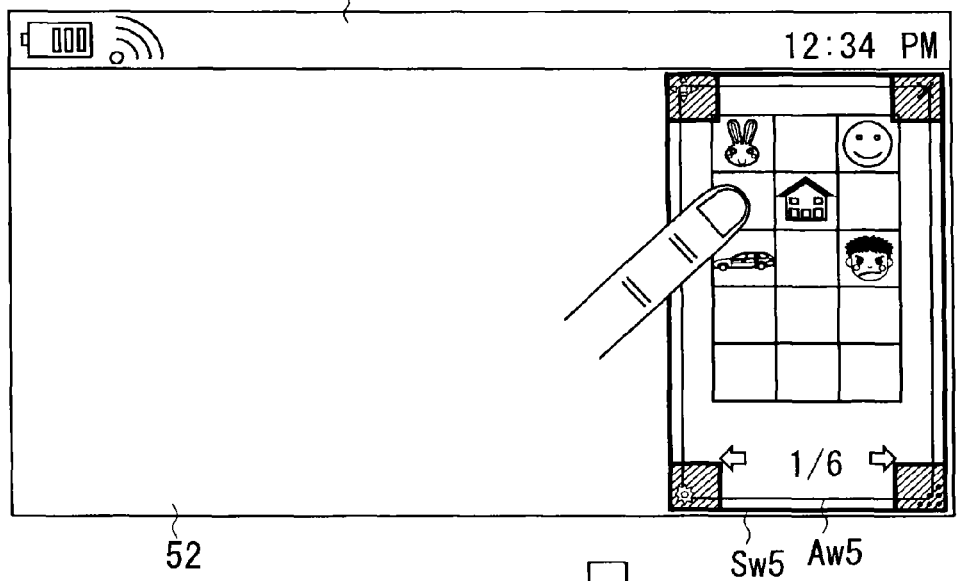
FIGS. 15A and 15B are schematic illustrations of a move of a selected window to a bottom position.
Figure 15B:
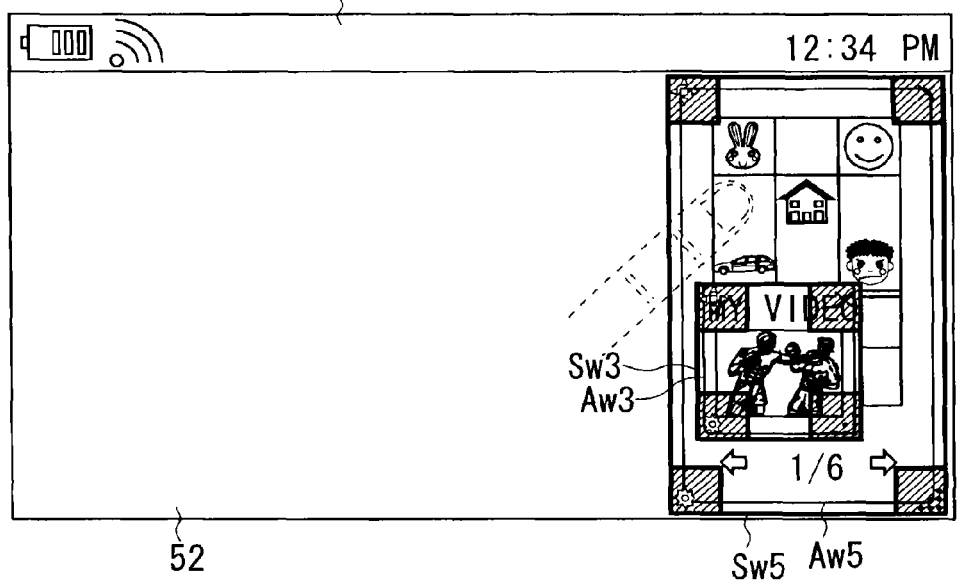

Additionally, in such a situation, the user can move the large selection/setting window Sw (e.g., Sw5) down to the lowermost level along with the underlying application window Aw (e.g., Aw5) by touching the large selection/setting window Sw (e.g., Sw5) at an area thereof other than the selection/setting icons Si by means of a finger and then moving the finger away from the area so as to make the hidden small selection/setting window Sw (e.g., Swx) and the underlying application window Aw (e.g., Aws) come up and lie on the large selection/setting window Sw (e.g., Sw5) as shown in FIGS. 15A and 15B.

Furthermore, when the display size of a selection/setting window Sw is changed as a result of that the size change icon Si4 is operated by the user in the selection/setting mode, the control section 30 is adapted to change the display size of the selection/setting icons Si in the selection/setting window Sw if necessary. The change of the display size of the selection/setting icons Si will be described in detail below.

(2-5) Change of Display Size of Selection/Setting Icons

A standard display size is defined for the selection/setting icons Si and the selection/setting icons Si are displayed with the standard display size. The standard display size is common to all the selection/setting icons Si. The display area of a selection/setting icon is such that it can be snugly touched by a finger of man (e.g., 1 cm long and 1 cm wide).

Figure 16:
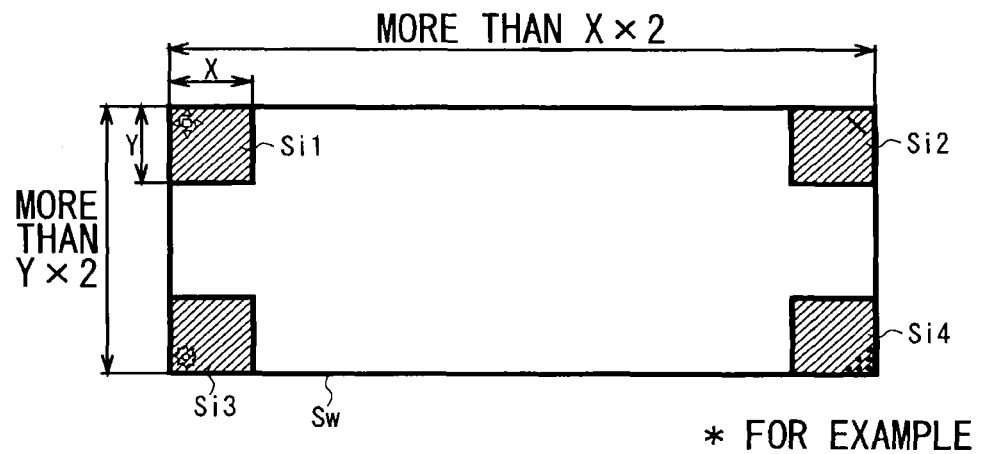
FIG. 16 is a schematic illustration of a selected icon displayed with a standard display size.

As shown in FIG. 16, the selection/setting icons Si of a selection/setting window Sw are displayed with this standard size when the selection/setting window Sw has a width not less than twice of the width of a selection/setting icon Si of the standard display size, or the width (X in FIG. 16) of a selection/setting icon Si of the standard display size×2 (e.g., 2 cm) and a height not less than twice of the height of a selection/setting icon Si of the standard display size, or the height (Y in FIG. 16) of a selection/setting icon Si of the standard display size×2 (e.g., 2 cm).

In other words, the selection/setting icons Si of a selection/setting window Sw are displayed with this standard size when the selection/setting icons Si arranged at the four corners of the selection/setting window Sw do not overlap with each other in the selection/setting window Sw (e.g., when the selection/setting window Sw has a width and a height equal to 2 cm).

Thus, the selection/setting icons Si of a selection/setting window Sw are constantly displayed with the standard size at the four corners of the selection/setting window Sw so long as the above requirement is met if the selection/setting window Sw is expanded or contracted.

However, when the selection/setting window Sw is contracted to such an extent (e.g., to show a width less than 2 cm and a height less than 2 cm) that the selection/setting icons Si arranged at the four corners of the selection/setting window Sw overlap with each other if they are displayed with the standard size, the control section 30 changes the display size of the selection/setting icons Si. The display size of the selection/setting icons Si is reduced to make them not overlap with each other to be more accurate.

Figure 17:
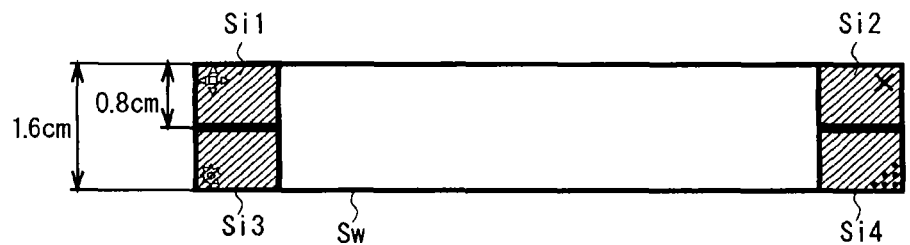
FIG. 17 is a schematic illustration of change (1) of the display size of a selected icon.

Assume here, for example, a width of 1 cm and a height of 1 cm are selected for the standard display size of selection/setting icons Si. Then, if the height of a selection/setting window Sw showing a width of not less than 2 cm and a height of not less than 2 cm is reduced to show a height of 1.6 cm as shown in FIG. 17, the control section 30 reduces the height of each of the selection/setting icons Si to 1.6/2=0.8 cm. Thus, as a result, the selection/setting icons Si being displayed in the selection/setting window Sw showing a reduced height do not overlap with each other in the window.

More specifically, as the height of the selection/setting icons Si is reduced to ½ of the reduced height of the selection/setting window Sw, the selection/setting icons Si1 through Si4 are arranged in such a way that the lower edge of the upper left corner selection/setting icon Si1 lies exactly on the upper edge of the lower left corner selection/setting icon Si3 and the lower edge of the upper right corner selection/setting icon Si2 lies exactly on the upper edge of the lower right corner selection/setting icon Si4.

Figure 18:
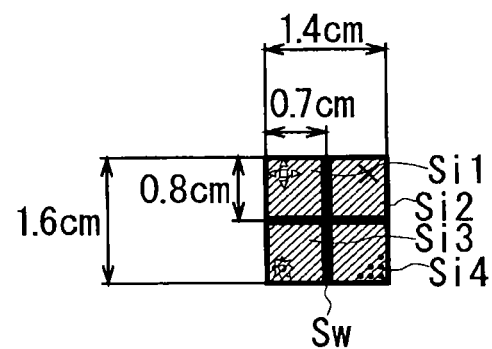
FIG. 18 is a schematic illustration of change (2) of the display size of a selected icon.

Assume again that the width of the selection/setting window Sw is reduced to 1.4 cm as shown in FIG. 18, the control section 30 reduces the width of each of the selection/setting icons Si to 1.4/2=0.7 cm. Thus, as a result, the selection/setting icons Si being displayed in the selection/setting window Sw showing a reduced width do not overlap with each other in the window.

More specifically, as the width of the selection/setting icons Si is reduced to ½ of the reduced width of the selection/setting window Sw, the selection/setting icons Si1 through Si4 are arranged in such a way that the right edge of the upper left corner selection/setting icon Si1 lies exactly on the left edge of the upper right corner selection/setting icon Si2 and the right edge of the lower left corner selection/setting icon Si3 lies exactly on the left edge of the lower right corner selection/setting icon Si4.

With the above-described arrangement, when the size of the selection/setting icons Si is reduced, it is reduced in such a way that they are displayed as large as possible within the limit of not overlapping with each other.

Thus, the control section 30 changes the display size of the selection/setting icons Si in each selection/setting window Sw in the above-described manner.

The smallest display size is defined for the display size of each selection/setting window Sw and each selection/setting window Sw is not able to be dimensionally reduced beyond this smallest size. The smallest display size may typically be equal to the size of a selection/setting icon Si of the standard display size (e.g., a width of 1 cm and a height of 1 cm).

Figure 19:
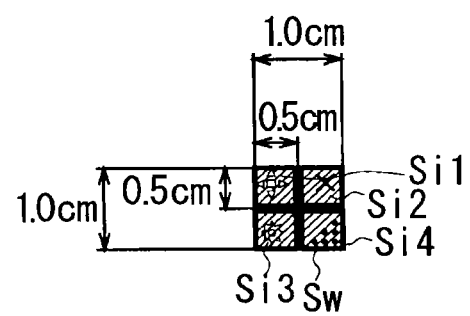
FIG. 19 is a schematic illustration of change (3) of the display size of a selected icon.

When a selection/setting window Sw is displayed with this smallest display size, each of the selection/setting icons Si in the selection/setting window Sw is displayed with such a size that the area of the selection/setting icon Si is ¼ of that of a selection/setting icon Si of the standard display size (e.g., with a width of 0.5 cm and a height of 0.5 cm) as shown in FIG. 19. Then, the selection/setting window Sw is divided into four equal parts and the selection/setting icons Si1 through Si4 take the respective parts. Then, the display size of each of the selection/setting icons Si (which is ¼ of the standard size of the selection/setting icons Si) is defined to be the smallest display size. The smallest display size of each selection/setting window Sw and that of each selection/setting icon Si are defined in such a way that a selection/setting icon Si of the smallest display size can be touched by a finger of man.

Thus, the display size of the selection/setting icons Si is not changed from the standard display size as long as the selection/setting icons Si in a selection/setting window Sw that are displayed with the standard display size do not overlap with each other if the display size of the selection/setting window Sw is reduced. In other words, the display size of the selection/setting icons Si is reduced only when the display size of the selection/setting window Sw is reduced further.

With this arrangement, the control section 30 displays the selection/setting icons Si with the standard display size as long as possible because the standard display size allows the selection/setting icons Si to be handled with ease on the touch panel while it can freely change the display size of each selection/setting window Sw.

The display size of the selection/setting icons Si of a selection/setting window Sw is changed not only when the size change icon Si4 is operated to do so but also when a selection/setting window Sw is moved and partly goes out of the window display region 52 so that the part of the selection/setting window Sw remaining in the window display region 52 is modified accordingly.

In such a situation, the control section 30 treats both the change of the display size of a selection/setting window Sw that is made when the size change icon Si4 is operated and the change of the display size of a selection/setting window Sw that is made in response to a move of the selection/setting window Sw equally as alterations relative to the display area of a selection/setting window Sw being displayed in the window display region 52.

More specifically, when the part of a selection/setting window Sw being displayed is modified as a result of that the selection/setting window Sw is moved and partly goes out of the window display region 52 and the size of the part being displayed is such that the selection/setting icons Si at the four corners of the part do not overlap with each other if they are displayed with the standard display size, the control section 30 keeps on displaying the selection/setting icons Si with the standard display size.

Figure 20:
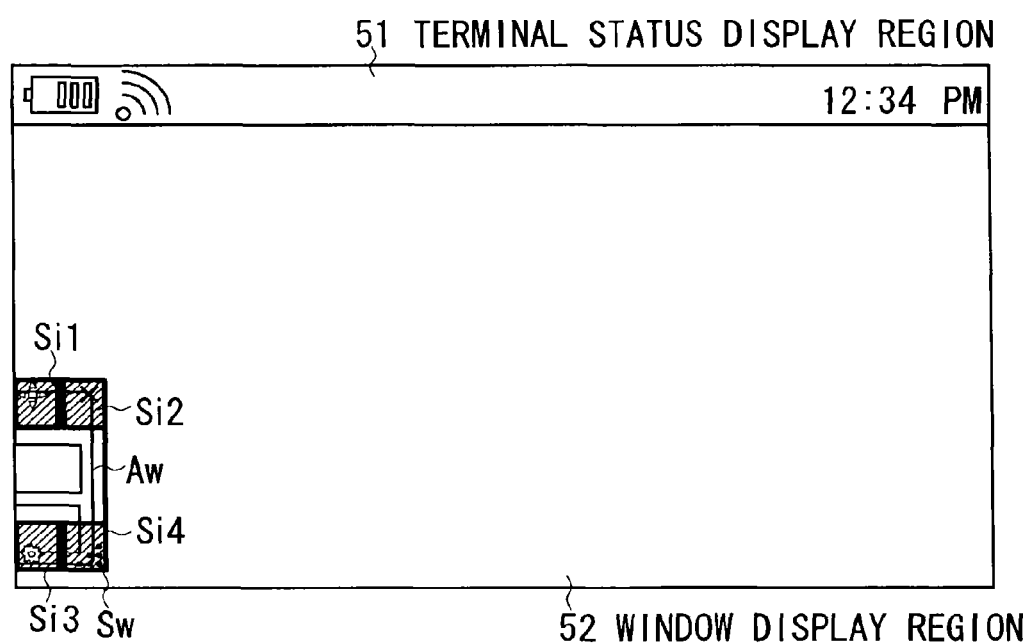
FIG. 20 is a schematic illustration of change (4) of the display size of a selected icon.

When, on the other hand, the selection/setting window Sw is moved to such an extent that the selection/setting icons Si at the four corners of the part overlap with each other if they are displayed with the standard display size, the control section 30 reduces the display size of the selection/setting icons Si so as to make not overlap with each other (e.g., and show a width of less than 2 cm and a height of less than 2 cm) as shown in FIG. 20.

In this way, when a selection/setting window Sw is moved and the part of the selection/setting window Sw being displayed in the window display region 52 is modified, the control section 30 changes the display size of each of the selection/setting icons Si.

(2-6) Icon Display Size Change Process Sequence

Figure 21:
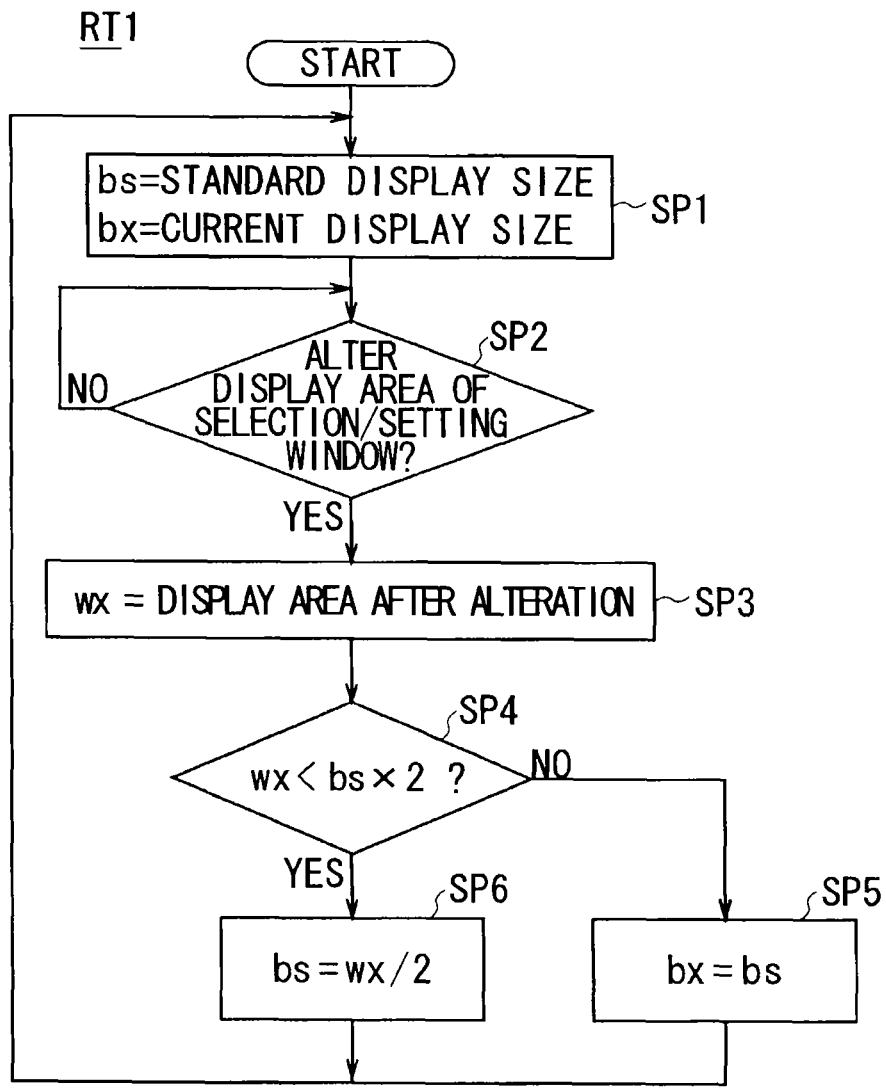
FIG. 21 is a flowchart of the icon display size change process sequence of the second embodiment.

Now, the sequence of the process of changing the display size of selection/setting icons Si (to be also referred to as icon display size change process sequence hereinafter) RT1 will be described in detail below by referring to the flowchart of FIG. 21. The control section 30 executes the icon display size change process according to the icon display size change process sequence RT1 mainly according to the program stored in the flash memory 31 or the mass storage flash memory 32. While the process sequence includes a sequence to be followed when changing the display size of selection/setting icons Si in the horizontal direction (in the direction of the X-axis) and a sequence to be followed when changing the display size of selection/setting icons Si in the vertical direction (in the direction of the Y-axis), they are basically the same and hence only the sequence to be followed when changing the display size in the horizontal direction (in the direction of the X-axis) will be described below.

As the control section 30 moves into a setting mode, it starts the icon display size change process sequence RT1 and goes into Step SP1.

In Step SP1, the control section 30 sets the width of the selection/setting icons Si, which are being displayed, of the standard size to variable bs and also sets the height of the selection/setting icons Si, which are being displayed, of the standard size to variable bx and then moves to the next step, or Step SP2. Note that, variable bs=variable bx if the width of the part of the selection/setting window Sw being displayed in the window display region 52 is not less than the width of the standard display size (in other words, the width of the selection/setting icons Si being displayed=the width of the standard display size).

In Step SP2, the control section 30 waits for a user's operation for altering the display area of the selection/setting window Sw in the window display region 52 (namely for changing the display size of the selection/setting window Sw or modifying the part of the selection/setting window Sw being displayed in the window display region 52 according to a move of the selection/setting window Sw).

As the control section 30 recognizes that such a user's operation is performed, it proceeds to Step SP3. In Step SP3, the control section 30 sets the width after the alteration of the display area of the selection/setting window Sw in the window display region 52 to variable wx and moves to the next step, or Step SP4.

In Step SP4, the control section 30 determines if the variable wx is smaller than the variable bs×2 or not. If the answer to the question in Step SP4 is negative, it means that the variable wx is not smaller than the variable bx×2 and hence the width after the alteration of the display area of the selection/setting window Sw in the window display region 52 is not less than the width×2 of the standard display size of selection/setting icons Si. Then, the control section 30 determines that the selection/setting icons Si in the selection/setting window Sw do not overlap with each other horizontally if the selection/setting icons Si are displayed with the width of the standard size and then moves to Step SP5.

In Step SP5, the control section 30 substitutes the variable bs for the variable bx and hence selects the width of the standard display size for the width of the selection/setting icons Si and returns to Step SP1.

If, on the other hand, the answer to the question in Step SP4 is positive, it means that the variable wx is smaller than the variable bs×2 and hence the width after the alteration of the display area of the selection/setting window Sw in the window display region 52 is less than the width×2 of the standard display size of selection/setting icons Si. Then, the control section 30 determines that the width of the selection/setting icons Si needs to be made smaller than the width of the standard size if the selection/setting icons Si are to be displayed without overlapping with each other horizontally and then moves to Step SP6.

In Step SP6, the control section 30 substitutes the variable wx/2 for the variable bx and hence selects ½ of the current width of the selection/setting window Sw for the width after the alteration of the display area of the selection/setting window Sw in the window display region 52 and returns to Step SP1.

Thereafter, the control section 30 repeats Steps SP1 through SP6 until it goes out of the selection/setting mode.

In this way, the control section 30 changes the display size of the selection/setting icons Si according to the icon display size change process sequence RT1 (in the horizontal direction in the above description of the sequence RT1).

Note that, when the control section 30 changes the display size of the selection/setting icons Si in the vertical direction, it sets the height of the standard display size of the selection/setting icons Si is to the variable bs and also the height of the display size of the selection/setting icons Si that are being displayed to the variable by instead of the variable bx in Step SP1 and then sets the height after the alteration of the display area of the selection/setting window Sw in the window display region 52 to the variable wy instead of the variable wx in Step SP3.

The process sequence for changing the height of the display size of the selection/setting icons Si is followed simultaneously or sequentially one after another with the process sequence for altering the width thereof.

(2-7) Operation and Effect

With the above-described arrangement, the information communication terminal 10 displays selection/setting windows Sw in the window display region 52 of a GUI image 50 where selection/setting icons Si are arranged at the four corners.

As described above, the information communication terminal 10 constantly displays selection/setting icons Si with the standard size in the display areas of selection/setting windows Sw in the window display region 52 so long as it can display selection/setting icons Si at the four corners without making them overlap with each other.

On the other hand, when it contracts the display area of a selection/setting window Sw in the window display region 52 to such an extent that the selection/setting icons Si at the four corners thereof overlap with each other if they are displayed in the display area with the standard display size, the information communication terminal 10 reduces the display size of the selection/setting icons Si so as to make them not overlap with each other.

In such a case, the information communication terminal 10 displays the selection/setting icons Si with a size that is maximally close to the standard display size by reducing the display size of the selection/setting icons Si so as to make their closely located sides lying one on the other in the direction perpendicular to the direction in which the display size is reduced.

With this arrangement, the information communication terminal 10 can provide a GUI image where selection/setting icons Si are displayed with the standard display size that allows the user to handle them with ease on the touch panel as long as possible but the display size of each of the selection/setting windows Sw can be changed freely.

The information communication terminal 10 displays selection/setting windows Sw where selection/setting icons Si that are common to all the application windows Aw are arranged only in a selection/setting mode. Thus, no selection/setting icons Si are displayed in the application window Aw in any other mode of operation so that all the display region of the application window Aw can be effectively utilized by individual application programs.

With the above-described arrangement, the information communication terminal 10 does not change the display size of the selection/setting icons Si of any selection/setting window Sw if it reduces the display area of the selection/setting window Sw so long as the selection/setting icons Si of the standard display size do not overlap with each other but reduces the display size of the selection/setting icons Si only when the display area of the selection/setting window Sw is reduced further to such an extent that the selection/setting icons Si do not overlap with each other. Therefore, the display area of each selection/setting window Sw can be changed freely while maximally maintaining the standard display size of the selection/setting icons Si thereof. Thus, this embodiment can a raise the degree of freedom of manipulating a selection/setting window Sw while minimizing the fall of the operability of the selection/setting icons Si in the selection/setting window Sw.

(3) Third Embodiment

Now, the third embodiment of the present invention, which is a concrete example of the first embodiment, will be described below. In the third embodiment, a degree of importance is assigned to each selection/setting icon Si and, when it is determined that two selection/setting icons Si overlap with each other, the display size of the selection/setting icon Si having a higher degree of importance (the lower priority selection/setting icon Si for changing the display size) is not changed, whereas that of the selection/setting icon Si having a lower degree of importance (the higher priority selection/setting icon Si for changing the display size) is changed.

In other words, the third embodiment differs from the second embodiment in terms of the method of changing the display size of each selection/setting icon Si. Otherwise, the configuration of the information communication terminal 10 of the third embodiment is same as that of the second embodiment and hence the icon display size change process sequence will be mainly described below.

Figure 22:
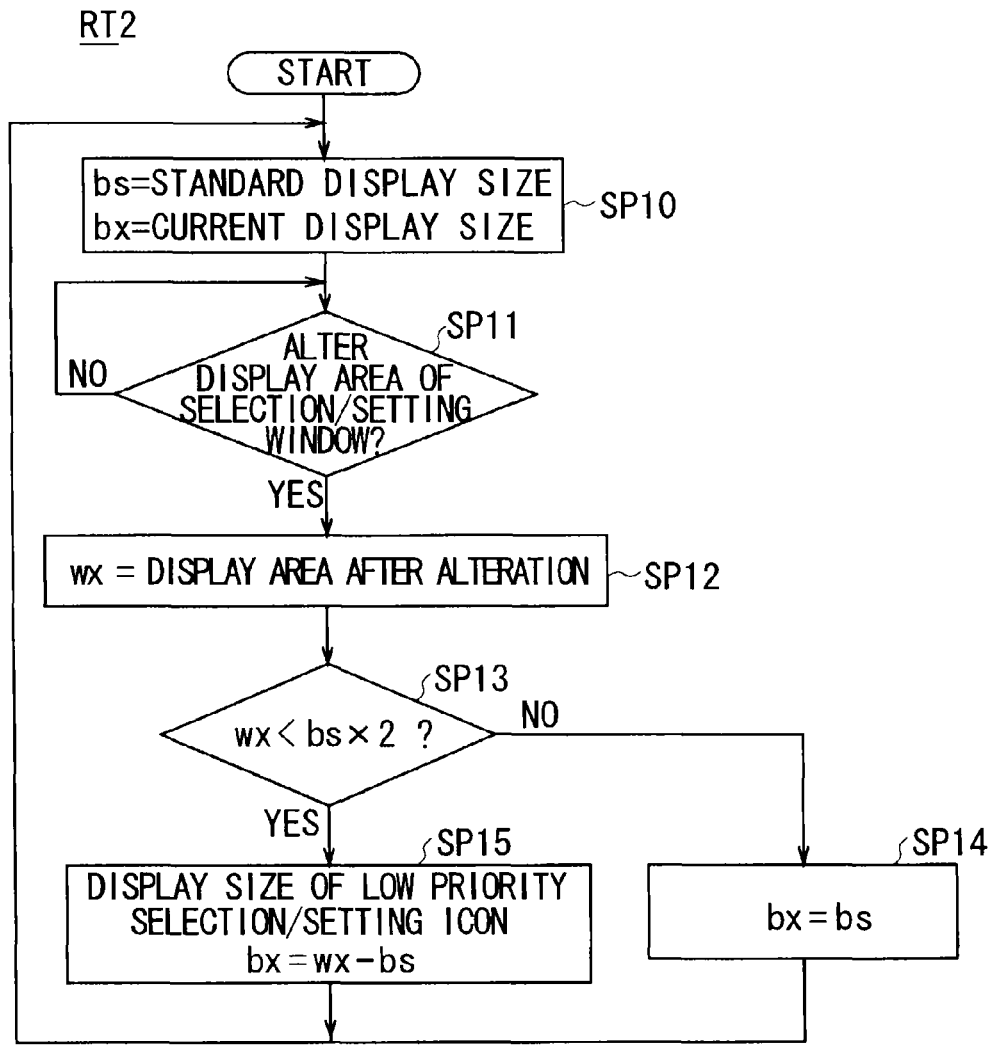
FIG. 22 is a flowchart of the icon display size change process sequence of the third embodiment.

The icon display size change process sequence RT2 of the third embodiment will be described below in detail by referring to the flowchart of FIG. 22. The control section 30 executes the icon display size change process according to the icon display size change process sequence RT2 mainly according to the program stored in the flash memory 31 or the mass storage flash memory 32. While the process sequence includes a sequence to be followed when changing the display size of selection/setting icons Si in the horizontal direction (in the direction of the X-axis) and a sequence to be followed when changing the display size of selection/setting icons Si in the vertical direction (in the direction of the Y-axis), they are basically same and hence only the sequence to be followed when changing the display size in the horizontal direction (in the direction of the X-axis) will be described below.

Assume here that a degree of importance is defined for each selection/setting icons Si1 through Si4. More specifically, assume that the property icon Si3 has the lowest degree of importance because it is most likely operated when the display area of the selection/setting window Sw is reduced and the closing icon Si2 has the next lowest degree of importance, whereas the move icon Si1 has the third lowest degree of importance and the size change icon Si4 has the highest degree of importance.

As the embodiment moves into a selection/setting mode, the control section 30 starts to follow the icon display size change process sequence RT2 and moves into Step SP10.

In Step SP10, the control section 30 sets the width of the selection/setting icons Si, which are being displayed, of the standard size to variable bs and also sets the height of the selection/setting icons Si, which are being displayed, of the standard size to variable bx and then moves to the next step, or Step SP11. Note that, variable bs=variable bx if the width of the part of the selection/setting window Sw being displayed in the window display region 52 is not less than the width of the standard display size (in other words, the width of the selection/setting icons Si being displayed=the width of the standard display size).

In Step SP11, the control section 30 waits for a user's operation for altering the display area of the selection/setting window Sw in the window display region 52 (namely for changing the display size of the selection/setting window Sw or modifying the part of the selection/setting window Sw being displayed in the window display region 52 according to a move of the selection/setting window Sw).

As the control section 30 recognizes that such a user's operation is performed, it proceeds to Step SP12. In Step SP12, the control section 30 sets the width after the alteration of the display area of the selection/setting window Sw in the window display region 52 to variable wx and moves to the next step, or Step SP13.

In Step SP13, the control section 30 determines if the variable wx is smaller than the variable bs×2 or not. If the answer to the question in Step SP13 is negative, it means that the variable wx is not smaller than the variable bx×2 and hence the width after the alteration of the display area of the selection/setting window Sw in the window display region 52 is not less than the width×2 of the standard display size of selection/setting icons Si. Then, the control section 30 determines that the selection/setting icons Si in the selection/setting window Sw do not overlap with each other horizontally if the selection/setting icons Si are displayed with the width of the standard display size and then moves to Step SP14.

In Step SP14, the control section 30 substitutes the variable bs for the variable bx and hence selects the width of the standard size for the width of the selection/setting icons Si and returns to Step SP1.

If, on the other hand, the answer to the question in Step SP13 is positive, it means that the variable wx is smaller than the variable bs×2 and hence the width after the alteration of the display area of the selection/setting window Sw in the window display region 52 is less than the width×2 of the standard display size of selection/setting icons Si. Then, the control section 30 determines that the width of one of the selection/setting icons Si having a lower degree of importance from the adjacently located two selection/setting icons Si needs to be made smaller than the width of the standard display size if the selection/setting icons Si are to be displayed without overlapping with each other horizontally and then moves to Step SP15.

In Step SP15, the control section 30 defines the width (bx) of the selection/setting icon Si having the lowest degree of importance to be equal to (the width of the display area of the selection/setting window Sw in the window display region 52 after the alteration (wx)—the width (bs) of the selection/setting icon Si having the highest degree of importance) and returns to Step SP10 without changing the width of the selection/setting icon Si having a higher degree of importance from the standard display size of the width (bs).

Thereafter, the control section 30 repeats Steps SP10 through SP15 until it goes out of the selection/setting mode.

In this way, the control section 30 changes the display size of the selection/setting icons Si according to the icon display size change process sequence RT2 (in the horizontal direction in the above description).

Note that, when the control section 30 changes the display size of the selection/setting icons Si in the vertical direction, it sets the height of the standard display size of the selection/setting icons Si is to the variable bs and also the height of the display size of the selection/setting icons Si that are being displayed to the variable by instead of the variable bx in Step SP10 in the icon display size change process sequence RT2 and then sets the height after the alteration of the display area of the selection/setting window Sw in the window display region 52 to the variable wy instead of the variable wx in Step SP12 and alter the height of the display size of one of the selection/setting icons Si based on the degree of importance of the adjacently located two selection/setting icons Si in the vertical direction.

The process sequence for changing the height of the display size of the selection/setting icons Si is followed simultaneously or sequentially one after another with the process sequence for altering the width thereof.

Figure 23:
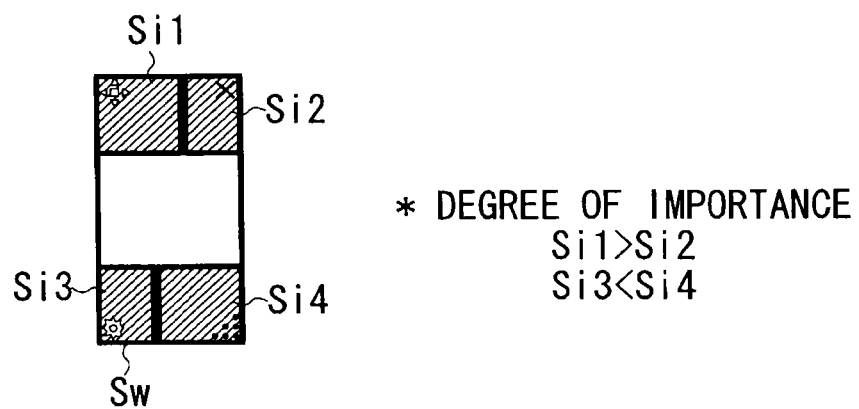
FIG. 23 is a schematic illustration of a change of the display size of a selected icon of the third embodiment.

In this way, when the display area of a selection/setting window Sw is reduced to such an extent that the selection/setting icons Si arranged at the four corners of the display area overlap with each other if they are displayed with the standard display size in the information communication terminal 10 of the third embodiment, as shown in FIG. 23, any adjacently two located selection/setting icons Si can be displayed without overlapping with each other in the reduced display area of the selection/setting window Sw by reducing the display size of the selection/setting icon Si having a lower degree of importance of the two.

Additionally, the selection/setting icon Si that is most likely operated when the display area of the selection/setting window Sw is reduced has the highest degree of importance among the four selection/setting icons Si in the information communication terminal 10. In other words, the selection/setting icon Si that is most likely operated when the display area of the selection/setting window Sw is reduced is displayed with a large display size if compared with the other selection/setting icons Si.

With this arrangement, the display size of a selection/setting window Sw can be changed freely, while the selection/setting icon Si thereof that is most likely operated when the display area of the selection/setting window Sw is reduced is displayed with the standard display size as long as possible because it can be operated with ease with such a display size by the touch panel.

Figure 24:
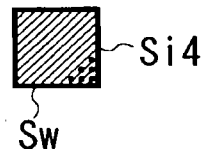
FIG. 24 is a schematic illustration of the smallest display size of a selected window.

Note that the display size of the selection/setting windows Sw of this embodiment is defined to be same as the smallest display size of the first embodiment of the selection/setting windows Sw. When a selection/setting window Sw is displayed with this smallest display size, only the size change icon Si4 that has the highest degree of importance is displayed with the standard display size in the selection/setting window Sw as shown in FIG. 24. Then, the display size of the selection/setting window Sw is substantially the same as the display size of the size change icon Si4.

The smallest display size of each of the selection/setting icons Si can be defined appropriately. When some of the selection/setting icons Si become smaller than the smallest display size as a result of size change, they may be undisplayed.

(4) Other Embodiments

Figure 25A:
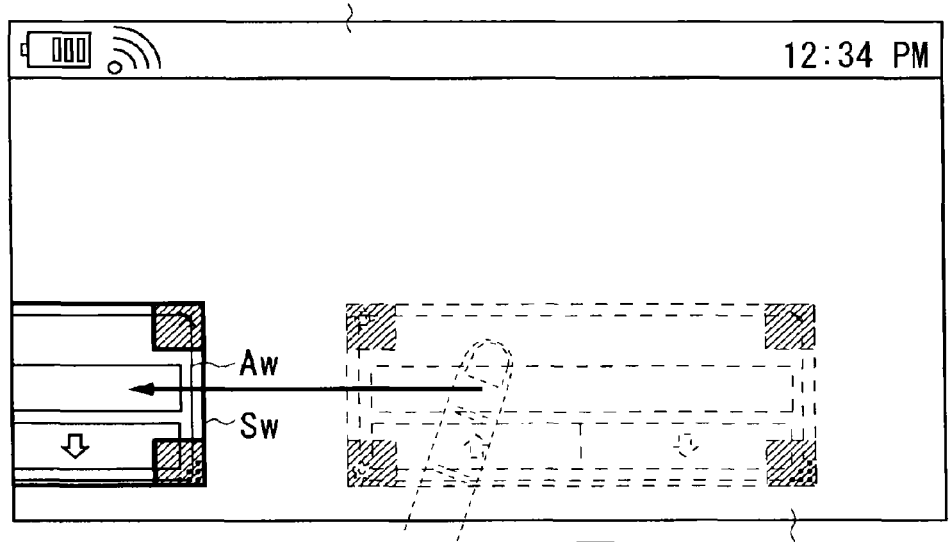
FIGS. 25A and 25B are schematic illustrations of an automatic position adjustment of a selected window.
Figure 25B:
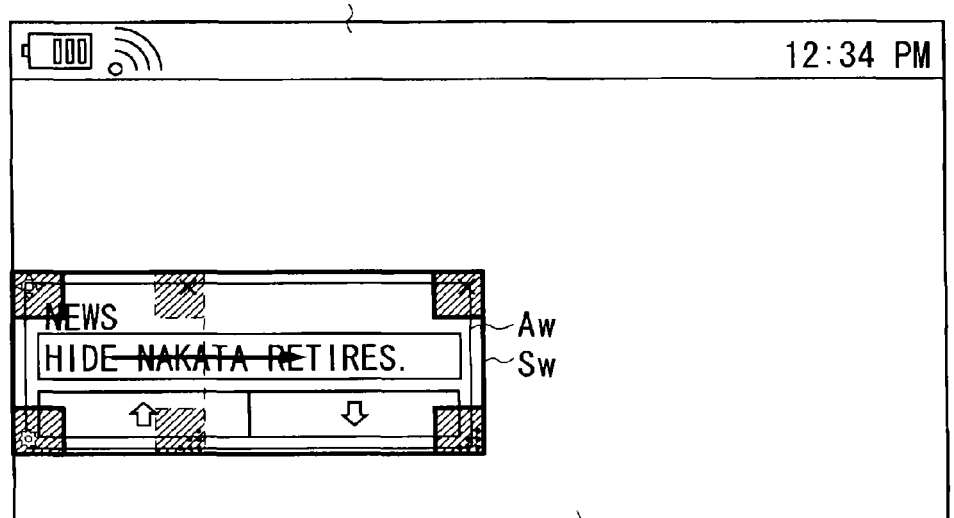

When a selection/setting window Sw is moved in a desired direction in the window display region 52 of the second embodiment, the selection/setting window Sw partly moves out of the window display region 52, the selection/setting icons Si being displayed in the selection/setting window Sw are rearranged in the above description. However, the present invention is by no means limited thereto and, when a selection/setting window Sw partly moves out of the window display region 52, the position of the selection/setting window Sw may be automatically adjusted so that the selection/setting window Sw is moved back to some extent so that all the selection/setting window Sw may be found within the window display region 52 as illustrated in FIGS. 25A and 25B.

With this arrangement, all the selection/setting icons Si found in a selection/setting window Sw can constantly be operated.

Figure 26A:
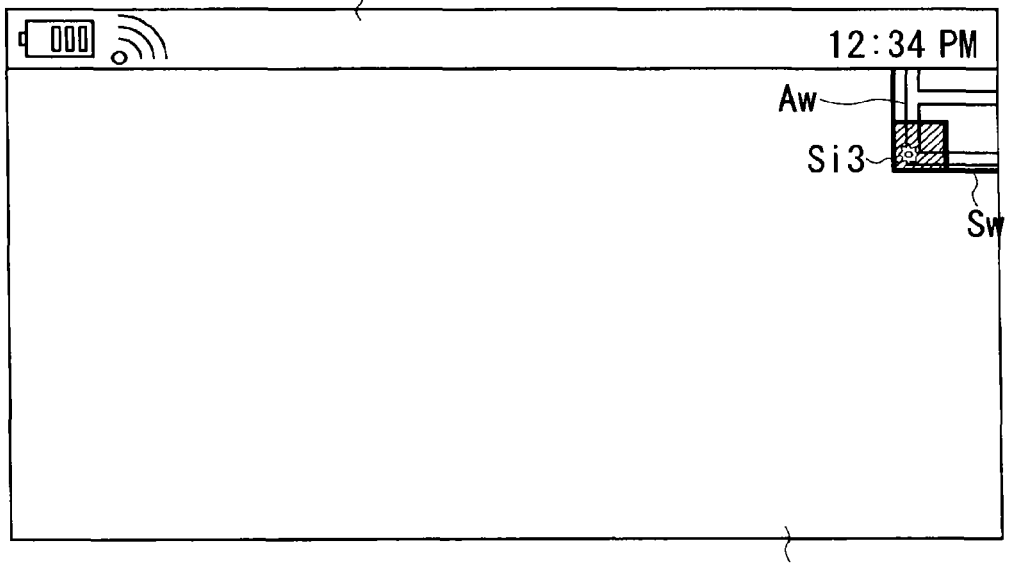
FIGS. 26A and 26B are schematic illustrations of replacement of a selected icon by another icon.
Figure 26B:
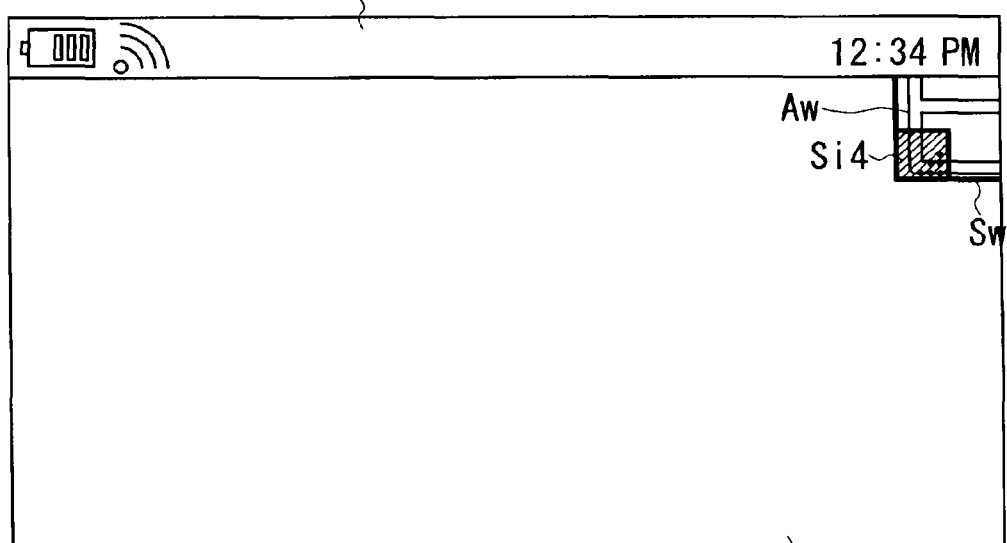

Still alternatively, when some of the selection/setting icons Si are no longer displayed because the selection/setting window Sw partly moves out of the window display region 52, the positions of the selection/setting icons Si may be adjusted so as to display the selection/setting icon having the highest degree of importance. For example, when the selection/setting icon Si that has the lowest degree of importance is displayed out of the four selection/setting icons Si1 through Si4 as shown in FIG. 26A, the selection/setting icon Si is replaced by the selection/setting icon Si having the highest degree of importance among the selection/setting icons Si1 to Si4 as shown in FIG. 26B. With this arrangement, at least the selection/setting icon Si having the highest degree of importance can constantly be operated.

The display size of the selection/setting icons Si is reduced from the standard display size when the display area of the selection/setting window Sw is reduced, in the above-described second embodiment. Then, the region that can sense a touch given to a selection/setting icon Si on the display screen (to be referred to as recognition region hereinafter) is reduced because the recognition region and the selection/setting icon Si have the same size, or the recognition region is same as the selection/setting icon Si in accordance with the display size change of the selection/setting icons Si.

As the recognition region of a selection/setting icon Si is reduced, the operability is reduced relative to the selection/setting icons Si. In view of this problem, the display size of the selection/setting icons Si may be reduced without reducing the size of the respective recognition regions for the purpose of the present invention.

Figure 27:
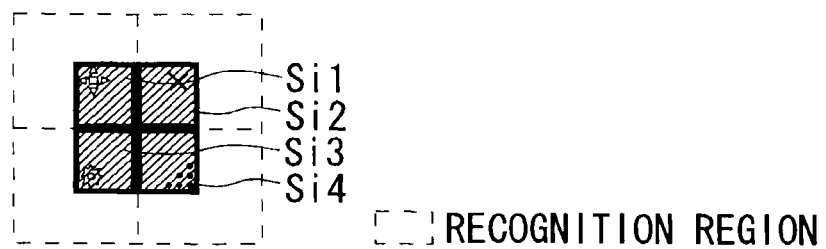
FIG. 27 is a schematic illustration of changing the display size of selection/setting icons without altering recognition regions thereof.

More specifically, as shown in FIG. 27, the display size of the selection/setting icons Si is reduced but the recognition regions of the selection/setting icons Si are constantly held to a size same as the standard display size to prevent any fall of the operability of the selection/setting icons Si. The recognition regions of the selection/setting icons Si need to be arranged so as not to overlap with each other. Thus, for example, each of the recognition regions may be arranged so as to include the display area of the corresponding selection/setting icon Si and goes out of the display area of the selection/setting icon Si and the boundary of the corresponding selection/setting window Sw.

Figure 28:
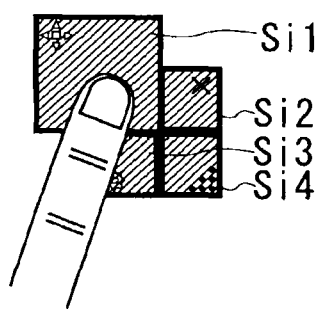
FIG. 28 is a schematic illustration of expansion of a selection/setting icon that is touched by a user.

However, the present invention is by no means limited thereto. For example, it may alternatively be so arranged that the display size of a selection/setting icon Si is expanded only when the recognition region of the selection/setting icon Si is touched as shown in FIG. 28. With this arrangement, the user can easily recognize the selection/setting icon Si that he or she touches.

The display size of the selection/setting icons Si of a selection/setting window Sw is reduced to make them not overlap with each other whenever necessary when the display area of the selection/setting window Sw is reduced in the above-described second embodiment. However, the present invention is by no means limited thereto and the command assigned to one of the two adjacently located selection/setting icons Si that has a lower degree of importance may be replaced by the command assigned to the selection/setting icon Si having a higher degree of importance when the display size of the selection/setting icons Si is reduced to not larger than a predetermined display size. The positions of the marks of the selection/setting icons Si may also be altered in response to the replacement of command. The expression of a degree of importance as used above has a meaning same as the one used for the third embodiment.

Figure 29:
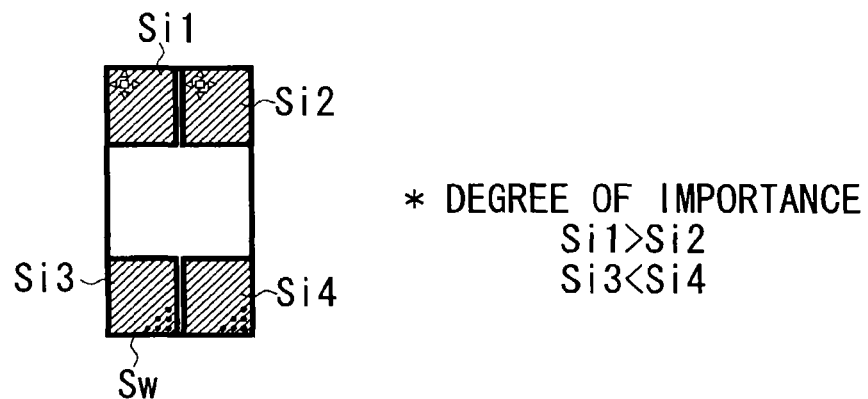
FIG. 29 is a schematic illustration of replacement (1) of a command of a selection/setting icon.

More specifically, for example, when the width of the selection/setting icons Si is reduced below a predetermined value (e.g., less than the standard display size), the command assigned to the selection/setting icon Si having a lower degree of importance of the two selection/setting icons Si that are horizontally arranged side by side is replaced by the command assigned to the other selection/setting icon Si having a higher degree of importance as illustrated in FIG. 29. Then, as a result, the same command is assigned to the two selection/setting icons Si that are horizontally arranged side by side.

With this arrangement, the area that can be used for inputting the command originally assigned to the selection/setting icon Si having a higher degree of importance is doubled so that the user can easily input the command, although the user is not able to input the command assigned to the selection/setting icon Si having a lower degree of importance.

Figure 30:
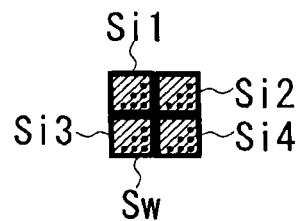
FIG. 30 is a schematic illustration of replacement (2) of the command of a selection/setting icon.

Thus, when all the four selection/setting icons Si1 through Si4 are ultimately displayed with the smallest display size as shown in FIG. 30, the command having the highest degree of importance (the size alteration command in this example) is assigned to all the selection/setting icons Si1 through Si4 in the selection/setting window Sw as shown in FIG. 30 to produce an effect same as the one that is produced when only the selection/setting icon Si to which the command having the highest degree of importance is assigned is displayed in the selection/setting window Sw. Such a replacement of command can be applied to the third embodiment.

The standard display size of selection/setting icon Si is so selected that the user can satisfactorily touch the part of a selection/setting icon Si that is being displayed by a finger and hence manipulate the touch panel 16 with ease in the above-described second and third embodiments. However, the present invention is by no means limited thereto and the standard display size may be selected appropriately according to the input device, the size of the display screen and/or the application.

Similarly, the smallest display size of selection/setting window Sw and that of selection/setting icon Si may be selected appropriately.

The highest degree of importance is assigned to the selection/setting icon Si that is most likely operated among the four selection/setting icons Si1 through Si4 and the display size of each selection/setting icon Si is altered according to the degree of importance thereof in the above-described third embodiment. However, the present invention is not limited thereto and it may alternatively be so arranged that the user can define the degree of importance of each of the icons Si1 through Si4 of each selection/setting window Sw or the degree of importance of each of the selection/setting icons Si may be defined according to various requirements to be met.

A total of four selection/setting icons Si are arranged at the four corners of a selection/setting window Sw in the above-described second and third embodiments. However, the present invention is by no means limited thereto and alternatively at least two selection/setting icons Si may be arranged at predetermined respective positions in a selection/setting window Sw. Still alternatively, commands other than those assigned to the above-described second and third embodiments may be respectively assigned to the selection/setting icons Si.

The display size of each selection/setting icon Si is reduced to such an extent that the selection/setting icons Si do not overlap with each other in the above-described second and third embodiments. However, the present invention is by no means limited thereto and each selection/setting icon Si may alternatively be reduced to such an extent that the gap separating any two adjacently located selection/setting icons Si does not fall below a predetermined value (e.g. 5 mm) or still alternatively the display size of each selection/setting icon Si may be reduced when the display area of the selection/setting window Sw falls below a set of predetermined values (e.g., 2.5 cm for the height and 2.5 cm for the width).

While multi-window type GUI images 50 are applied to the above-described second and third embodiments of the present invention, the present invention is not limited thereto and GUI images of any other type may be applied to the present invention so long as a GUI image can display two or more than two icons in a window. While the present invention is applied to selection/setting windows Sw that are laid on respective application windows Aw in the above description, the present invention can also be applied to windows of various types so long as two or more than two icons are arranged in each window. While selection/setting windows Sw are laid on the respective application windows Aw and displayed in a selection/setting mode in the above-described second and third embodiments, selection/setting icons Si may alternatively be arranged in advance on application windows Aw or, still alternatively, it may be so arranged that selection/setting icons Si are displayed on application windows Aw in a selection/setting mode.

The program for executing the icon display size change process is stored in the flash memory 31 or the mass storage flash memory 32 in the above-described second and third embodiments. However, the present invention is by no means limited thereto and it may alternatively be so arranged that the program is stored in a removal medium 39 and the information communication terminal 10 reads out the program from the removal medium 39 by way of the drive 38 and installs it in the flash memory 31 or the mass storage flash memory 32. Still alternatively, it may be so arranged that the information communication terminal 10 downloads the program by way of the wireless communication section 35 and installs it in the flash memory 31 or the mass storage flash memory 32.

While the information communication terminal 10 is formed mainly by a control section 30 that operates as display control section, command assignment section and priority defining section and a touch panel 16 that operates as command input section in each of the above-described second and third embodiments, the present invention is not limited thereto and an information communication terminal 10 according to the embodiment of the present invention can be formed by using other components so long as it is provided with those functional features. For example, while the control section 30 is provided with functional features that allow it to operate as display control section, command assignment section and priority defining section in the information communication terminal 10 of the second embodiment, the information communication terminal 10 alternatively is made to have pieces of hardware that are provided respectively with the functional feature of a display control section, that of a command assignment section and that of a priority defining section. Furthermore, the touch panel 16 that operates as command input section may be replaced by a mouse and other components.

The present invention can find applications not only in the field of portable information communication terminals 10 but also in the field of other various information processing apparatus including personal computers and game machines.

The present invention is by no means limited to the above-described first through third embodiments and parts or all of the above-described first through third embodiments and other embodiments may appropriately be combined or part of which may be extracted within the scope of the present invention.

The present invention can find applications in information processing apparatus having a window type GUI.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
 processing circuitry configured to
  display, via a display control section, a window on a display screen showing a first icon and a second icon of each having a current display size,
  define, via a priority defining section, a priority for the first icon and the second icon, the priority being determined in part based on which icon is operated the most between the first and the second icon,
  reduce, via the display control section, the current display size of at least one of the first icon or the second icon based on an icon having a lowest priority to avoid overlap with each other in response to
   a display area size of the window being reduced, and the display control section determining that the icons would overlap with each other as a result of the reduction of the display area size if the current display size of the first and second icons is maintained, and expand the current display size of the first or second icon in response to a selection of the first or second icon, wherein when the display control section reduces the display size of the first icon or the second icon, a size of recognition regions for recognizing operations relative to the reduced first icon or the second icon on the screen is maintained, the recognition regions being regions that can recognize an input on the display screen.

2. The information processing apparatus according to claim 1, wherein the processing circuitry is further configured to input, via a command input section, a command to the window being displayed on the screen, wherein the display control section alters the display area of the window in accordance with the command to the window input by way of the command input section.

3. The information processing apparatus according to claim 2, wherein, when a command for reducing the display size of the window is input by way of the command input section, the display control section alters the display area of the window by reducing the display size of the window in accordance with the command.

4. The information processing apparatus according to claim 2, wherein, when a command for changing the display size of the window is input by way of the command input section, the display control section shifts the display position of the window in accordance with the command, alters the display area of the window in the case where the window partly moves out of the display screen as a result of the shift of the display position, and in the case where the display control section determines that at least either the first icon or the second icon moves out of the display area of the window as a result of the alteration of the display area, the display control section moves the icon outside the display area back into the display area so as to be displayed.

5. The information processing apparatus according to claim 2, wherein, when a command for changing the display size of the window is input by way of the command input section, the display control section shifts the display position of the window in accordance with the command and in the case where the window partly moves out of the screen as a result of the shift of the display position, the display control section adjusts the display position of the window to make the window entirely to be displayed on the display screen.

6. The information processing apparatus according to claim 1, wherein the processing circuitry further includes assigning, via a command assigning section, a first command and a second command respectively to the first icon and the second icon, wherein the command assigning section selects either the first command assigned to the first icon or the second command assigned to the second icon, making only the selected command effective, when the display size of either the first icon or the second icon is made smaller than a predetermined display size under the control of the display control section.

7. The information processing apparatus according to claim 1, wherein the display control section has a first mode of altering the display area of the window and a second mode of not altering the display area of the window and alters the display area of the window being on the screen only in the first mode.

8. The information processing apparatus according to claim 1, wherein the command input section is a touch panel.

9. A display control method comprising:

causing, via a processor, a display control section to display a window on a display screen showing a first icon and a second icon each having a current display size;

defining, via the processor, a priority for the first icon and the second icon, the priority being determined in part based on which icon is operated the most between the first and the second icon;

reducing, via the processor, the current display size of at least one of the first icon or the second icon based on an icon having a lowest priority to avoid overlap with each other in response to a display area size of the window being reduced, and the display control section determining that the icons would overlap with each other as a result of the reduction of the display area size if the current display size of the first and second icons is maintained; and expanding the current display size of the first or second icon in response to a selection of the first or second icon, wherein when the display size of the first icon or the second icon is reduced, a size of recognition regions for recognizing operations relative to the reduced first icon or the second icon on the screen is maintained, the recognition regions being regions that can recognize an input on the display screen.

10. A non-transitory computer-readable medium storing computer-readable instructions thereon which when executed by a computer cause the computer to perform a method comprising:

causing a display control section to display a window on a display screen showing a first icon and a second icon each having a current display size;

defining, via the a processor, a priority for the first icon and the second icon, the priority being determined in part based on which icon is operated the most between the first and the second icon;

reducing the current display size of at least one of the first icon or the second icon based on an icon having a lowest priority to avoid overlap with each other in response to a display area size of the window being reduced, and the display control section determining that the icons would overlap with each other as a result of the reduction of the display area size if the current display size of the first and second icons is maintained; and expanding the current display size of the first or second icon in response to a selection of the first or second icon, wherein when the display size of the first icon or the second icon is reduced, a size of recognition regions for recognizing operations relative to the reduced first icon or the second icon on the screen is maintained, the recognition regions being regions that can recognize an input on the display screen.

11. The information processing apparatus according to claim 1, wherein the display control section only reduces the current display size of the icon having the lowest priority to avoid overlap with each other.

12. The information processing apparatus according to claim 1, wherein the display control section expands the current display size of only the first or only the second icon in response to a selection of the first or second icon.

13. The information processing apparatus according to claim 12, wherein the current display size of an unselected icon remains the same in response to the selection of another icon.

14. The information processing apparatus according to claim 1, wherein the processing circuitry further includes
assigning, via a command assigning section, a first command and a second command respectively to the first icon and the second icon, wherein
the command assigning section selects either the first command assigned to the first icon and or the second command assigned to the second icon to be effective based on the priority.

15. The information processing apparatus according to claim 1, wherein the priority is further determined based on which icon is operated the most between the first and the second icon when both the first icon and second icon are in a reduced icon state.

16. The information processing apparatus according to claim 1, wherein in response to the display area size of the window being reduced below a predetermined threshold and the display control section determining that the icons would overlap, the display control section displays only the icon having the highest priority.

17. The information processing apparatus according to claim 1, wherein the current display size of at least one of the first icon or the second icon is reduced while maintaining both the first icon and second icon on the display screen.

18. The information processing apparatus according to claim 1, wherein the recognition regions are regions that can recognize a touch input on the display screen.

\* \* \* \* \*